(12) United States Patent
Kawai et al.

(10) Patent No.: US 8,736,665 B2
(45) Date of Patent: May 27, 2014

(54) VIDEO PROCESSING APPARATUS

(75) Inventors: Jun Kawai, Kawasaki (JP); Katsutoshi Yano, Kawasaki (JP); Toshiaki Gomi, Kawasaki (JP); Hiroshi Yamada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 688 days.

(21) Appl. No.: 12/654,432

(22) Filed: Dec. 18, 2009

(65) Prior Publication Data

US 2010/0245607 A1    Sep. 30, 2010

(30) Foreign Application Priority Data

Mar. 31, 2009    (JP) .................................. 2009-088370

(51) Int. Cl.
| | | |
|---|---|---|
| H04N 7/00 | (2011.01) | |
| H04N 9/47 | (2006.01) | |
| H04N 13/04 | (2006.01) | |
| H04N 13/00 | (2006.01) | |
| H04N 7/18 | (2006.01) | |
| G06T 3/00 | (2006.01) | |
| G06T 3/40 | (2006.01) | |
| G06T 11/00 | (2006.01) | |
| G06T 3/60 | (2006.01) | |

(52) U.S. Cl.
CPC ....... *H04N 13/0497* (2013.01); *H04N 13/0055* (2013.01); *H04N 13/0475* (2013.01); *H04N 7/181* (2013.01); *G06T 3/0062* (2013.01); *G06T 3/4038* (2013.01); *G06T 11/00* (2013.01); *G06T 11/003* (2013.01); *G06T 3/60* (2013.01)
USPC .................. 348/39; 348/35; 348/36; 348/143; 348/148; 348/159

(58) Field of Classification Search
CPC ....... G06T 3/0062; G06T 3/4038; G06T 3/60; G06T 11/00; G06T 11/003; H04N 7/181; H04N 13/0055; H04N 13/0497; H04N 13/0475
USPC .................. 348/39, 38, 36, 143, 148, 159
See application file for complete search history.

(56) References Cited

U.S. PATENT DOCUMENTS 5,949,331 A * 9/1999 Schofield et al. ............. 340/461
7,266,219 B2 * 9/2007 Okamoto et al. ............. 382/104

(Continued)

FOREIGN PATENT DOCUMENTS

| JP | 11-348659 | 12/1999 |
| JP | 2002-027448 | 1/2002 |
| JP | 2003-158736 | 5/2003 |

*Primary Examiner* — Geepy Pe
(74) *Attorney, Agent, or Firm* — Staas & Halsey LLP

(57) ABSTRACT

The video processing apparatus includes: a pattern information storing unit that stores use part information and location information; a plurality of video inputting units that input each of a plurality of video data; a video data generating unit that generates a plurality of types of generated video data; a generated video pattern selecting unit that selects a pattern of generated video data to be generated; a process unit that stores the use part of each video data in a storing unit; and a video outputting unit that coordinate-converts the generated combined video data with coordinate conversion data, generates the generated video data, and outputs the generated video data to the display unit. The use part information indicates a use part of each video data used for the generated video data, and the location information includes reduction ratio information of the use part of the each video data.

8 Claims, 23 Drawing Sheets

(56) References Cited

U.S. PATENT DOCUMENTS

| | | | |
|---|---|---|---|
| 7,307,655 B1 * | 12/2007 | Okamoto et al. | 348/222.1 |
| 8,018,490 B2 * | 9/2011 | Yuasa et al. | 348/148 |
| 2003/0021490 A1 | 1/2003 | Okamoto et al. | |
| 2004/0085447 A1 | 5/2004 | Katta et al. | |

* cited by examiner

FIG. 9A

| CAMERA | VIDEO CLIPPING POSITION | REDUCTION RATIO (HORIZONTAL,VERTICAL) | WRITE START COORDINATE |
|---|---|---|---|
| 1 | (x1,y1,Δx1,Δy1) | (m1,n1)=(1.7,1.2) | (x1',y1') |
| 2 | (x2,y2,Δx2,Δy2) | (m2,n2)=(1.7,1.0) | (x2',y2') |
| 3 | (x3,y3,Δx3,Δy3) | (m3,n3)=(1.0,1.0) | (x3',y3') |
| 4 | (x4,y4,Δx4,Δy4) | (m4,n4)=(1.0,1.0) | (x4',y4') |

FIG. 9B

| CAMERA | VIDEO CLIPPING POSITION | WRITE START COORDINATE |
|---|---|---|
| 1 | (x1,y1,Δx1,Δy1) | (x1',y1',Δx1',Δy1') |
| 2 | (x2,y2,Δx2,Δy2) | (x2',y2',Δx2',Δy2') |
| 3 | (x3,y3,Δx3,Δy3) | (x3',y3',Δx3',Δy3') |
| 4 | (x4,y4,Δx4,Δy4) | (x4',y4',Δx4',Δy4') |

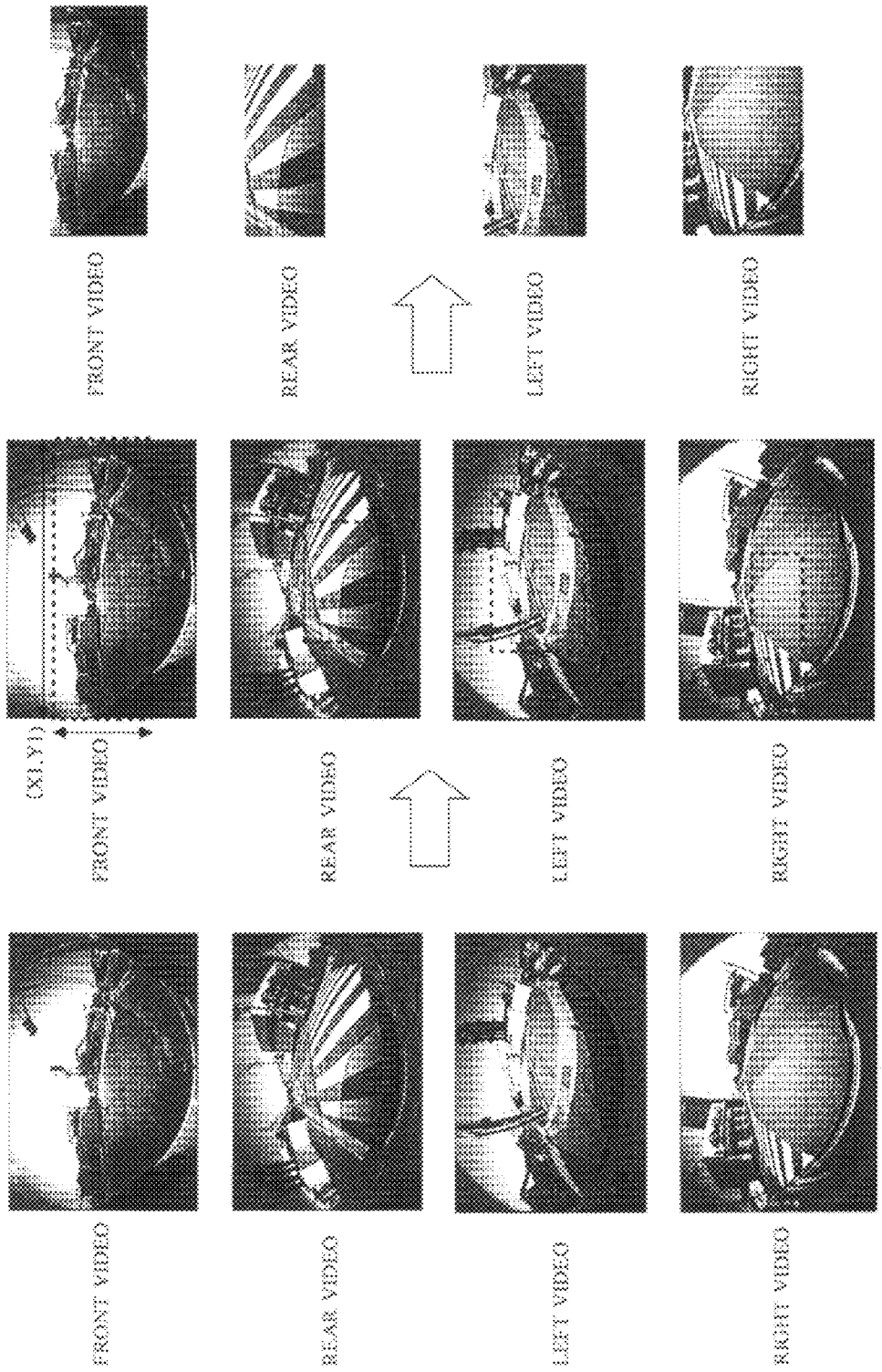

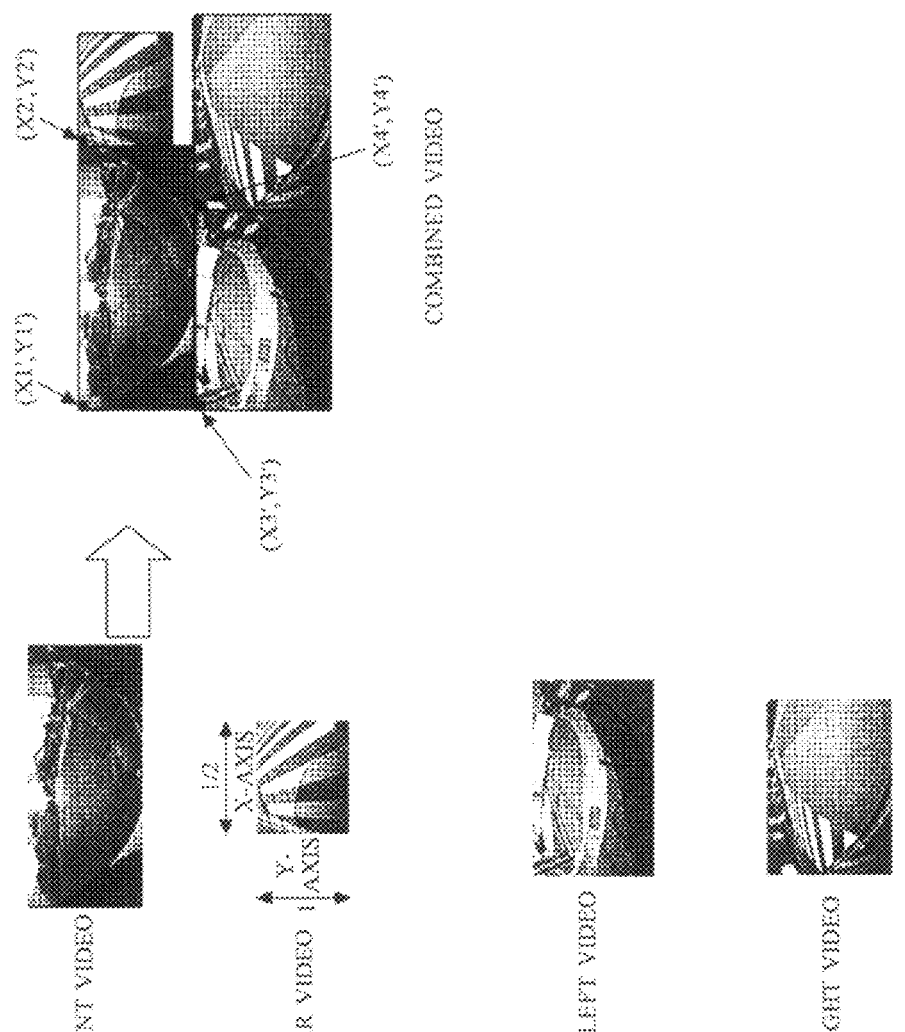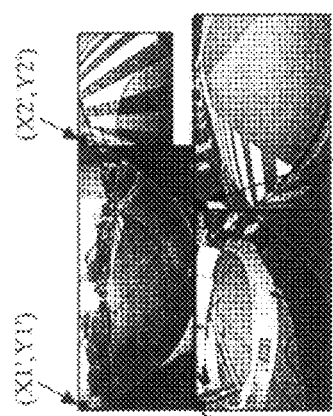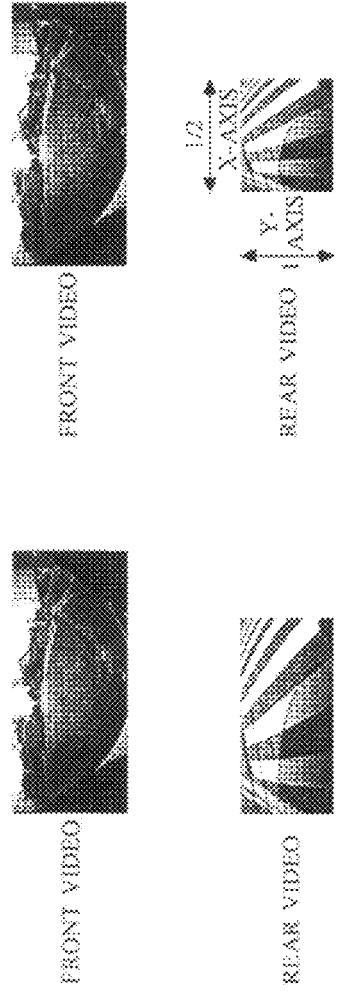

| POLYGON NUMBER | VERTEX NUMBER | CAMERA COMBINED VIDEO COORDINATE | GENERATED VIDEO PIXEL COORDINATE |
|---|---|---|---|
| 1 | 1 | s(1-1), t(1-1) | x"(1-1), y"(1-1) |
|   | 2 | s(1-2), t(1-2) | x"(1-2), y"(1-2) |
|   | 3 | s(1-3), t(1-3) | x"(1-3), y"(1-3) |
| 2 | 1 | s(2-1), t(2-1) | x"(2-1), y"(2-1) |
|   | 2 | s(2-2), t(2-2) | x"(2-2), y"(2-2) |
|   | 3 | s(2-3), t(2-3) | x"(2-3), y"(2-3) |
| ... | ... | ... | ... |

| POLYGON NUMBER | VERTEX NUMBER | CAMERA COMBINED VIDEO COORDINATE | 3D SPACE COORDINATE |
|---|---|---|---|
| 1 | 1 | s1,t1 | x1,y1,z1 |
|   | 2 | s2,t2 | x2,y2,z2 |
|   | 3 | s3,t3 | x3,y3,z3 |
| 2 | ⋮ | ⋮ | ⋮ |

VIEWPOINT VECTOR DATA : (Xs,Ys,Zs,Xe,Ye,Ze)

FRONT VIDEO0

REAR VIDEO

LEFT VIDEO

RIGHT VIDEO

| CAMERA VIDEO | POLYGON NUMBER | ENLARGEMENT RATIO IN X DIRECTION | ENLARGEMENT RATIO IN Y DIRECTION |
|---|---|---|---|
| 1 | 1 | 0.560 | 0.988 |
| | 2 | 0.250 | 0.800 |
| | ⋮ | ⋮ | ⋮ |
| | 300 | 5.660 | 2.400 |
| | ⋮ | ⋮ | ⋮ |
| 2 | 1 | 1.500 | 1.020 |
| | ⋮ | ⋮ | ⋮ |

| CAMERA VIDEO | REPRESENTATIVALUE OF PIXEL EXPANSION RATIO IN X DIRECTION | REPRESENTATIVALUE OF PIXEL EXPANSION RATIO IN Y DIRECTION |
|---|---|---|
| 1 | 3.200 | 2.200 |
| 2 | 2.000 | 1.000 |
| 3 | 5.600 | 7.250 |
| 4 | 5.660 | 7.300 |

TENTATIVE-SIZED PARTIAL VIDEO

FRONT VIDEO    REAR VIDEO    RIGHT VIDEO    LEFT VIDEO

LOCATION PATTERN

COMBINED VIDEO SIZE

COMBINED VIDEO SIZE

COMBINED VIDEO SIZE

COMBINED VIDEO SIZE

VIDEO PROCESSING APPARATUS

CROSS-REFERENCE TO RELATED APPLICATION

This application is based upon and claims the benefit of priority of the prior Japanese Patent Application No. 2009-088370, filed on Mar. 31, 2009, the entire contents of which are incorporated herein by reference.

FIELD

A certain aspect of the embodiments discussed herein is related to a video processing apparatus.

BACKGROUND

There is provided an apparatus that supports driver's safe driving, as the apparatus captures videos of an area around a vehicle that is out of driver's line of vision by using a camera mounted on the vehicle and displays captured videos on a monitor mounted in the vehicle interior.

Japanese Laid-Open Patent Publication No. 2002-027448 discloses an art to generate a synthesized video with captured images captured with multiple cameras.

SUMMARY

According to an aspect of the present invention, there is provided a video processing apparatus capable of cooperating with a plurality of capturing unit and a display unit, the video processing apparatus including: a plurality of video inputting units that input each of a plurality of video data captured with the plurality of capturing units; a pattern information storing unit that stores a plurality of setting information, each of which includes first information that indicates a clipping range of each of a plurality of partial video data to be clipped from the plurality of video data, and second information that includes locations of the plurality of partial video data in combined video data with respect to each of generating patterns of generated video data a generated video pattern selecting unit that selects a pattern of generated video data from the generating patterns; a process unit that first clips the plurality of partial video data from the plurality of video data based on the first information included in the setting information corresponding to the selected pattern, and then combines the plurality of partial video data that have been clipped based on the locations included in the second information of the setting information corresponding to the selected pattern to generate the combined video data corresponding to the selected pattern; and a video outputting unit that coordinate-converts, with first coordinate conversion data preliminarily calculated with respect to each pattern of the generating patterns, the combined video data generated by the process unit to generate the generated video data that is stereoscopic display, and outputs the generated video data to the display unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 9A and 9B are diagrams illustrating examples of setting information recorded in a setting holding unit of a capture preprocessing unit;

FIGS. 10A through 10C are diagrams illustrating a process of a process processing unit;

FIGS. 11A through 11C are diagrams illustrating a process continued from FIGS. 10A through 10C of a process processing unit;

DESCRIPTION OF EMBODIMENTS

As previously described, there is provided an apparatus that supports driver's safe driving, as the apparatus captures videos of an area around a vehicle that is out of driver's line of vision by using a camera mounted on the vehicle and displays captured videos on a monitor mounted in the vehicle interior.

Japanese Laid-Open Patent Publication No. 2002-27448 discloses an art to generate a synthesized video with captured images captured with multiple cameras.

However, a pattern of the synthesized video synthesized with videos captured with multiple cameras is one given pattern. Therefore, it is difficult to switch the synthesized video in response to, for example, driver's driving situation.

A description will now be given of an embodiment of the present invention with reference to the accompanying drawings.

Figure 1:
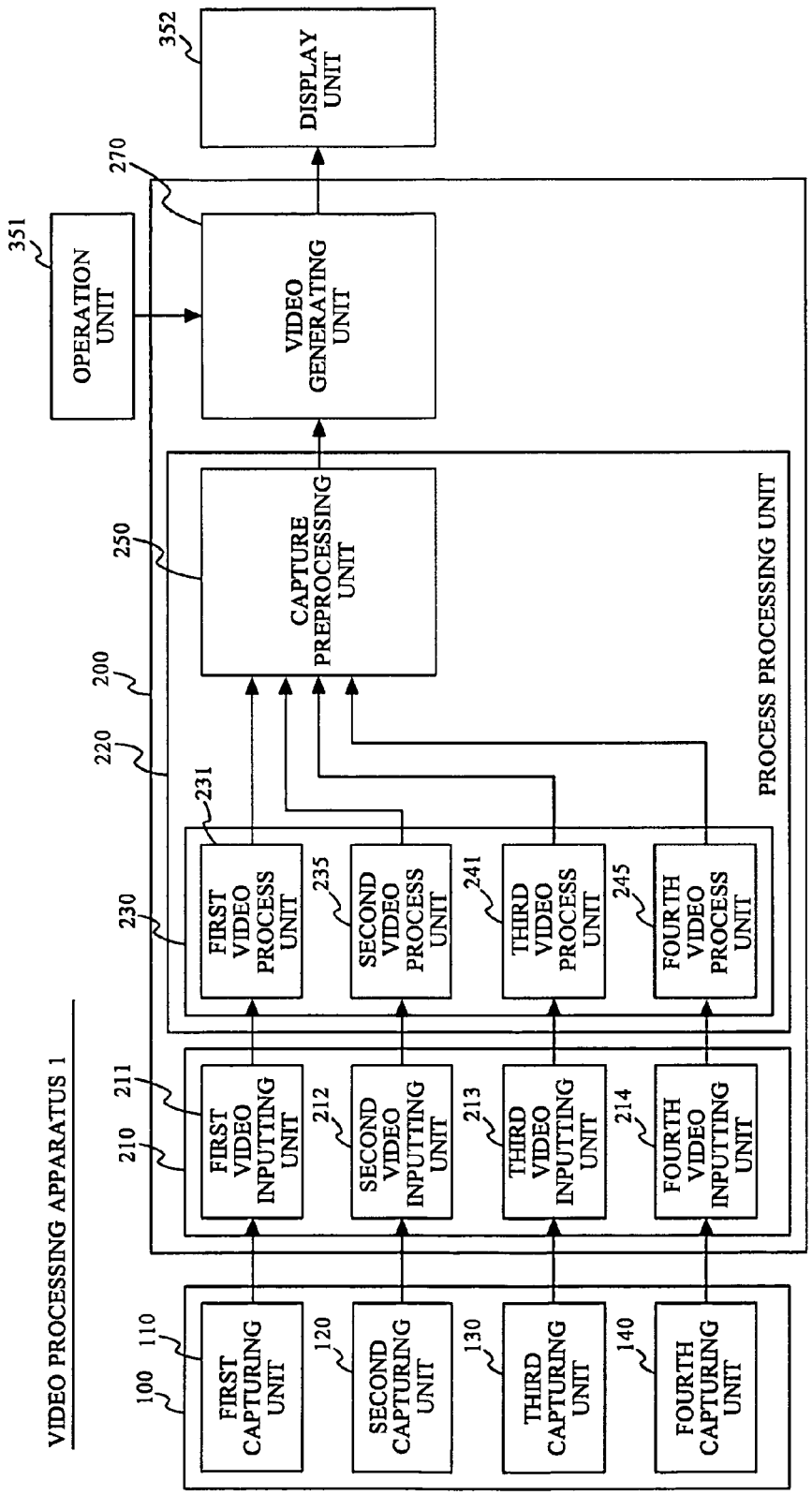
FIG. 1 is a diagram illustrating a composition of a video processing apparatus.

A composition of this embodiment will be described with reference to FIG. 1. As illustrated in FIG. 1, a video processing apparatus 1 of this embodiment is provided with a capturing unit 100, a video processing unit 200, an operation unit 351, and a display unit 352. The capturing unit 100 includes a first capturing unit 110, a second capturing unit 120, a third capturing unit 130 and a fourth capturing unit 140. The video processing unit 200 includes a video inputting unit 210, a process processing unit 220, and a video generating unit 270. A capture preprocessing unit 250 of the process processing unit 220, and the video generating unit 270 are mounted on a same board.

A description will now be given of the capturing unit 100.

Figure 2:
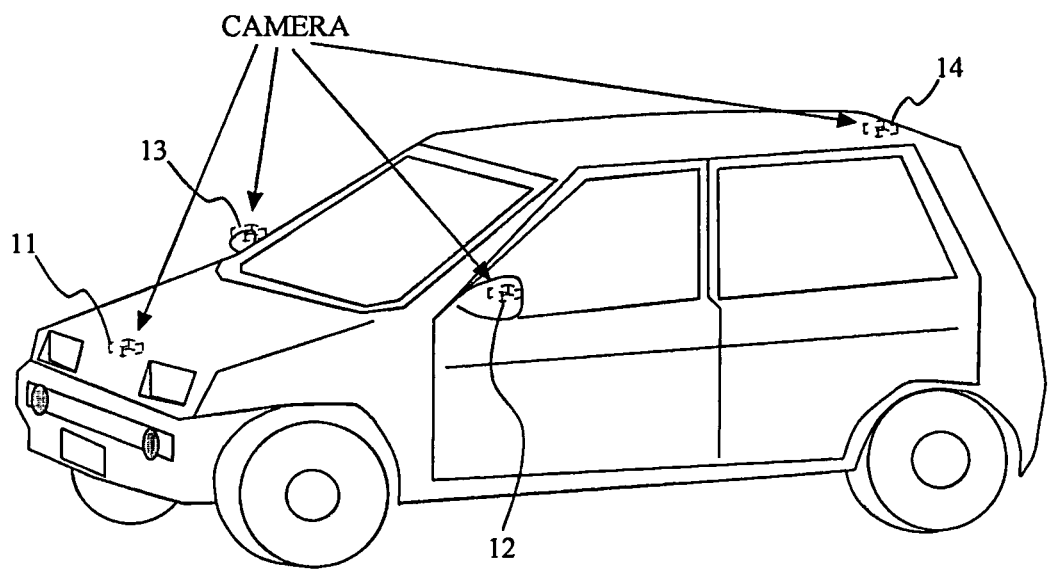
FIG. 2 is a diagram illustrating locations on which cameras are mounted in a vehicle.
Figure 3A:
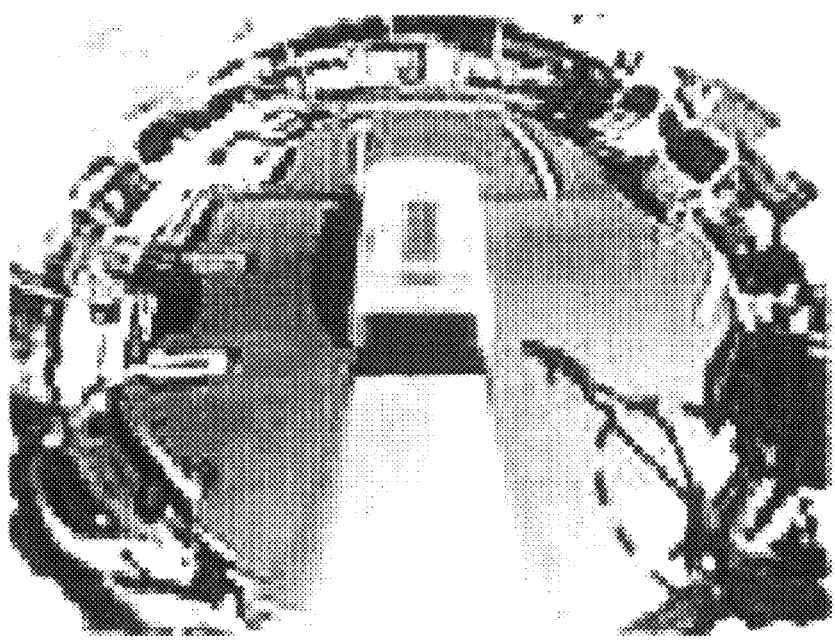
FIGS. 3A and 3B are diagrams illustrating an example of generated video data displayed on a display unit.
Figure 3B:
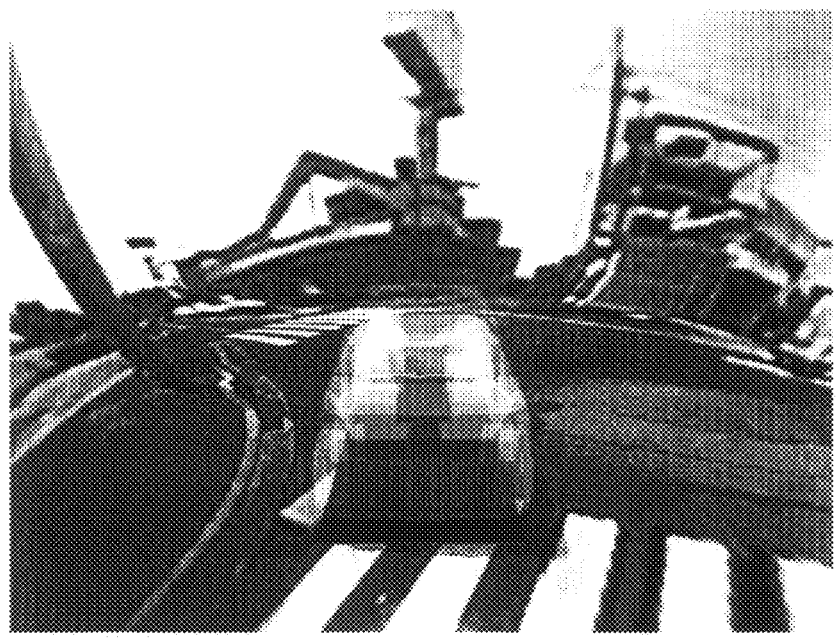
Figure 4A:
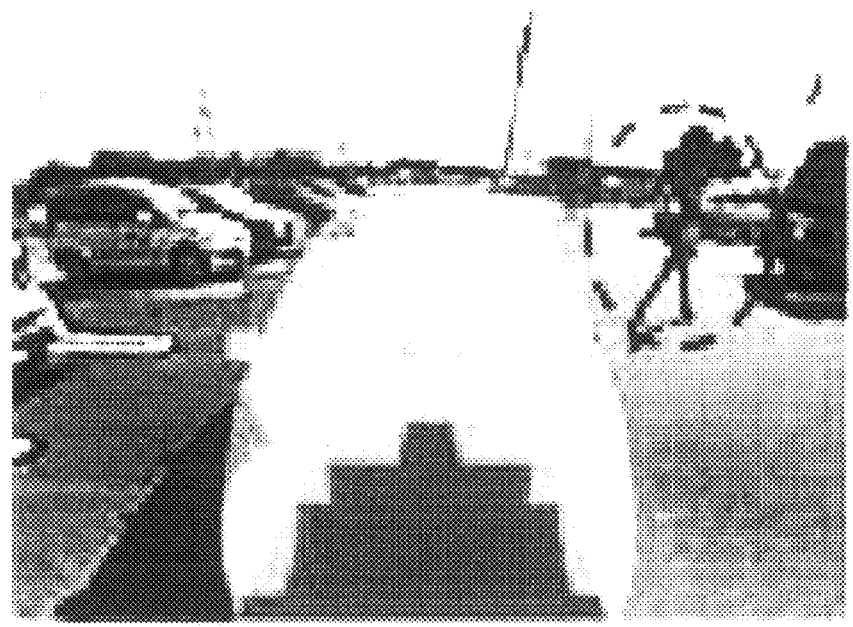
FIGS. 4A and 4B are diagrams illustrating an example of generated video data displayed on a display unit.
Figure 4B:
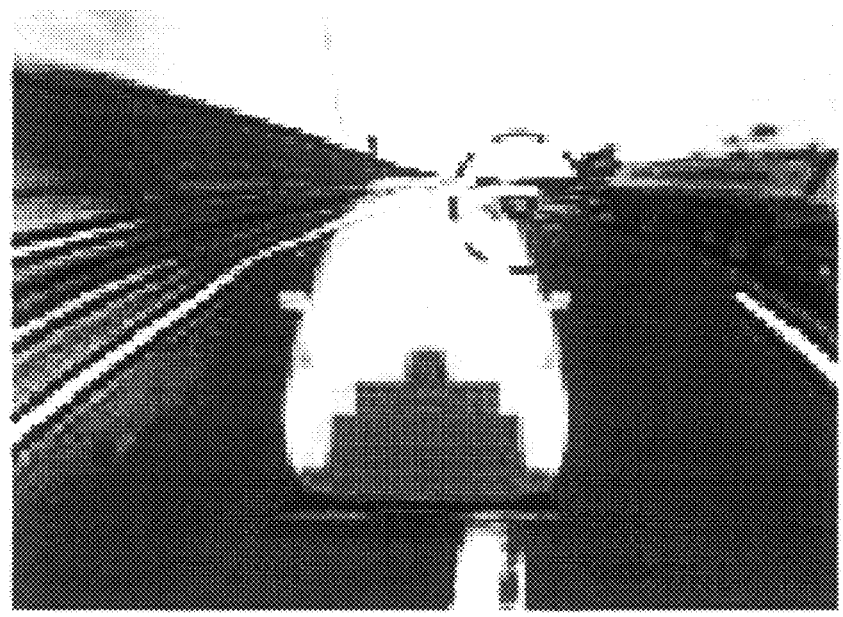
Figure 5A:
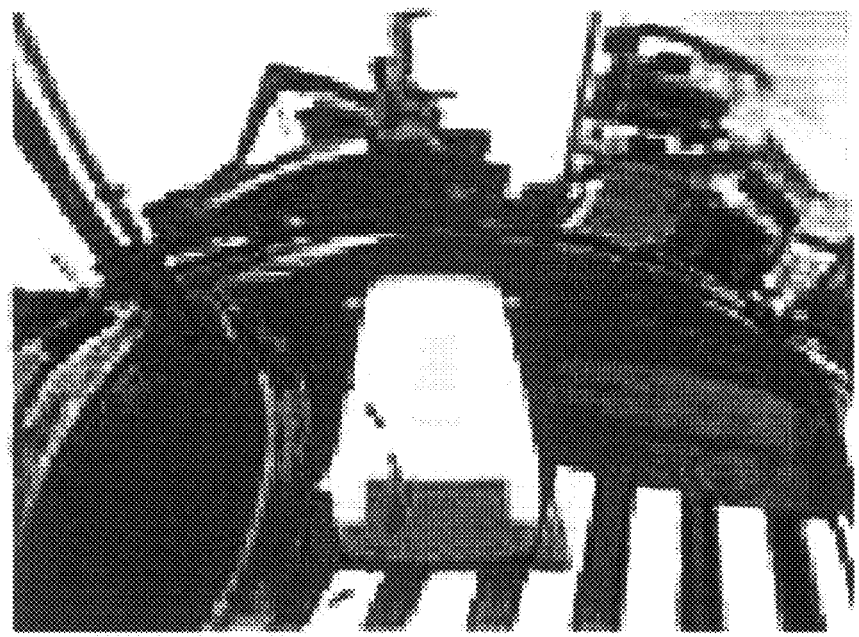
FIGS. 5A and 5B are diagrams illustrating an example of generated video data displayed on a display unit.
Figure 5B:
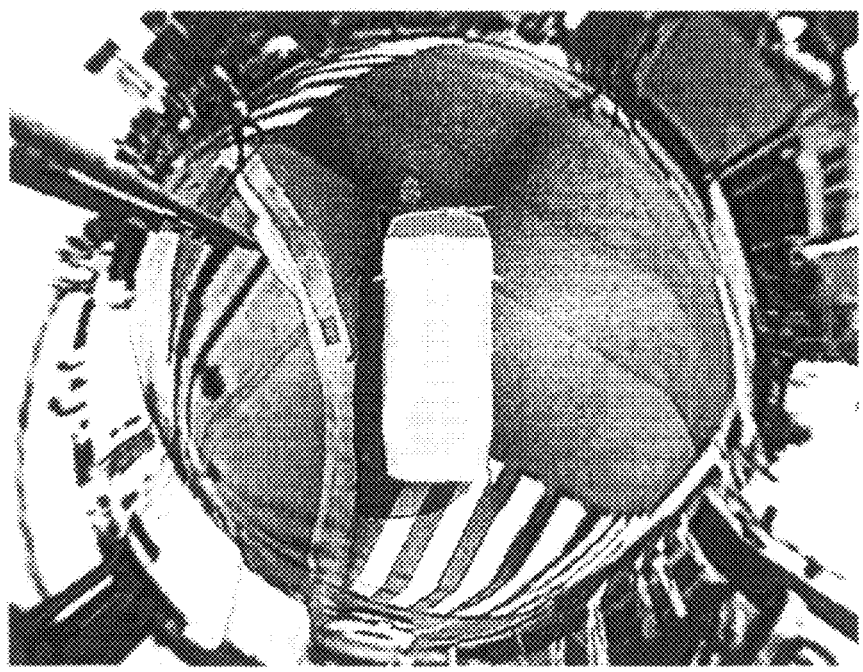

The first capturing unit 110 through the fourth capturing unit 140 are provided with a camera mounted on a vehicle, and outputs videos captured with each camera to the video inputting unit 210 respectively. Hereinafter, the first capturing unit 110 through the fourth capturing unit 140 will be called cameras 110 through 140 respectively. In this embodiment, as illustrated in FIG. 2, the camera 110 is installed in front of the vehicle, and captures the video of the front of the vehicle. The camera 120 is installed on the left side of the vehicle, and captures the video of the left side of the vehicle. The camera 130 is installed on the right side of the vehicle, and captures the video of the right side of the vehicle. The camera 140 is installed in the rear of the vehicle, and captures the video of the rear of the vehicle. In this embodiment, four cameras are installed in the vehicle, but the number of cameras is not limited to four, and can be three, five, or six. Cameras can be preliminarily mounted on the vehicle, if they can work in concert with each other.

The operation unit 351 receives operation inputs from an operator. A generated video generated from videos captured with cameras 110 to 140 is displayed on the display unit 352. The operator performs an operation to switch the pattern of the generated video displayed on the display unit 352.

Display examples (patterns) of generated video displayed on the display unit 352 will be illustrated in FIGS. 3A through 5B. FIGS. 6A through 6H illustrate patterns of combined video made with combination of four videos captured with cameras 110 to 140.

Figure 6A:
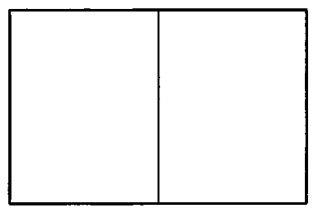
FIGS. 6A through 6H are diagrams illustrating patterns of combined video data used for generating a generated video.
Figure 6B:
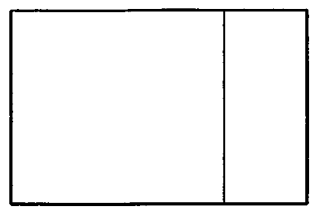
Figure 6C:
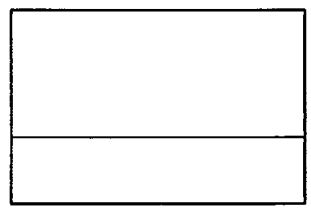
Figure 6D:
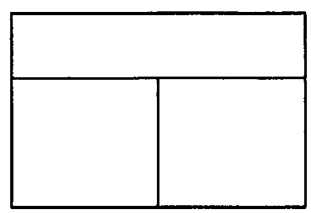
Figure 6E:
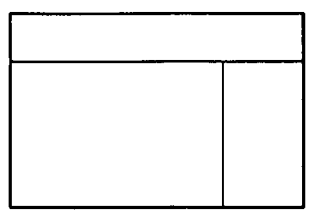
Figure 6F:
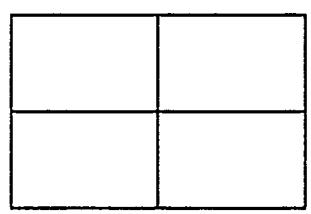
Figure 6G:
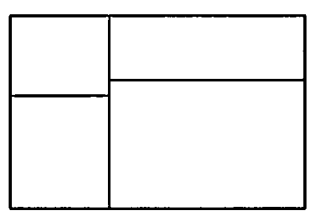
Figure 6H:
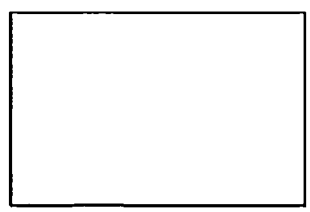

Videos made with combination of two videos as illustrated in FIGS. 6A through 6C; videos made with three videos as illustrated in FIGS. 6D and 6E; videos made with four videos as illustrated in FIGS. 6F and 6G; and a video made with a single video as illustrated in FIG. 6H are video-processed by the video processing unit 200, and displayed on the display unit 352. The video displayed on the display unit 352 is a generated video processed to be a stereoscopic display. The stereoscopic generated video is generated as multiple videos captured with cameras 110 to 140 are combined and coordinate-transformed (details will be described later). The combined video illustrated in FIGS. 6A through 6C is used to generate the generated video with only two videos of the left and the rear to check for a collision in left turn, for example.

The video made with combination of three videos as illustrated in FIGS. 6D and 6E is used to generate the generated video from three camera videos except the front camera video to look behind the vehicle in the lane change. The video made with combination of four videos as illustrated in FIGS. 6F and 6G is used to generate the video that enables the driver to check all around the vehicle. However, the divisions are changed, as which camera video is used more to generate the generated video depends on the viewpoint location of when the generated video is generated.

The video inputting unit 210 will now be described. The video inputting unit 210 is provided with a first video inputting unit 211, a second video inputting unit 212, a third video inputting unit 213, and a fourth video inputting unit 214.

The first video inputting unit 211 is a block receiving a video captured with the camera 110. The first video inputting unit 211 executes A/D conversion to the received video, and outputs the A/D converted video data to a first video process unit 231 of a video process unit 230.

The second video inputting unit 212 is a block receiving a video captured with the camera 120. The second video inputting unit 212 executes A/D conversion to the received video, and outputs the A/D converted video data to a second video process unit 235 of the video process unit 230.

The third video inputting unit 213 is a block receiving a video captured with the camera 130. The third video inputting unit 213 executes A/D conversion to the received video, and outputs the A/D converted video data to a third video process unit 241 of the video process unit 230.

The fourth video inputting unit 214 is a block receiving a video captured with the camera 140. The fourth video inputting unit 214 executes A/D conversion to the received video, and outputs the A/D converted video data to a fourth video process unit 245 of the video process unit 230.

Figure 7:
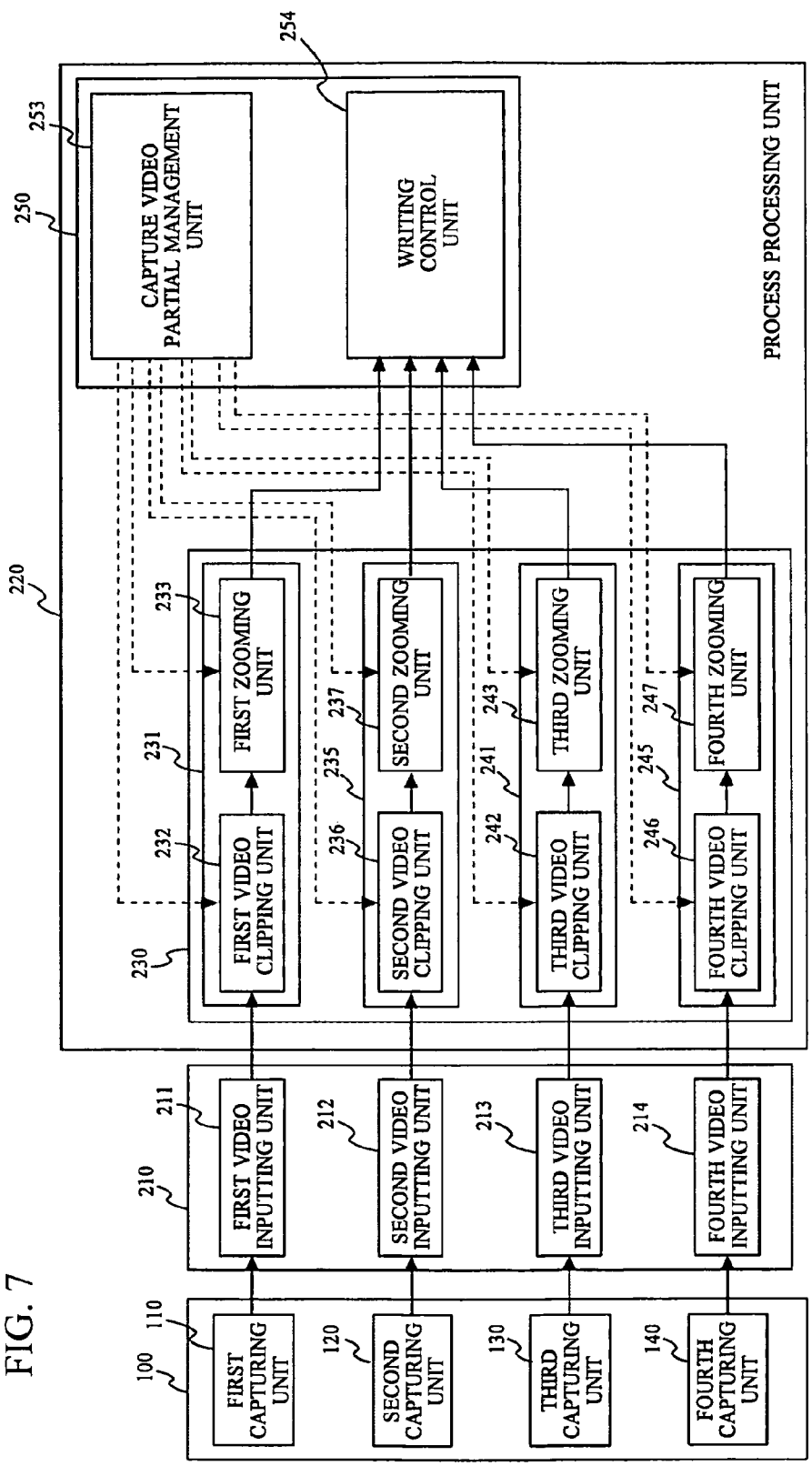
FIG. 7 is a diagram illustrating compositions of a capturing unit, a video inputting unit, and a process processing unit.

Then, a description will be given of the process processing unit 220 with reference to FIG. 7. The process processing unit 220 is provided with the video process unit 230, and the capture preprocessing unit 250.

The video process unit 230 is provided with the first video process unit 231, the second video process unit 235, the third video process unit 241, and the fourth video process unit 245. The first video process unit 231 is provided with a first video clipping unit 232, and a first zooming unit 233. The second video process unit 235 is provided with a second video clipping unit 236, and a second zooming unit 243. The third video process unit 241 is provided with a third video clipping unit 242, and a third zooming unit 237. The fourth video process unit 245 is provided with a fourth video clipping unit 246, and a fourth zooming unit 247. The first video process unit 231 through the fourth video process unit 245 have a same composition. Therefore, hereinafter, the first video process unit 231 will be described as a representative of them.

The first video clipping unit 232 receives the video data output from the first video inputting unit 211. The first video clipping unit 232 receives an indication signal that indicates a clipping position of the video from a capture video partial management unit 253 described later. The first video clipping unit 232 clips a given region of the video according to the indication signal, and outputs the clipped video (hereinafter, called partial video data) to the first zooming unit 233.

The first zooming unit 233 receives the partial video data output from the first video clipping unit 232. The first zooming unit 233 receives an indication signal that indicates the enlargement ratio or the reduction ratio of the video from the capture video partial management unit 253. The first zooming unit 233 enlarges or reduces the partial video data with the enlargement ratio or the reduction ratio indicated by the capture video partial management unit 253. The first zooming unit 233 outputs the enlarged or reduced partial video data to a writing control unit 254.

In this embodiment, the number of the video inputting unit 210 and the video process unit 230 is four in accordance with the number of cameras 110 to 140 mounted on the vehicle. But the number of the video inputting unit 210 and the video process unit 230 is not limited to four, and may be six in the system using six cameras, for example. The video data captured with four cameras 110 to 140 may be input to and processed by one video inputting unit 210 and one video process unit 230, one by one.

Figure 8:
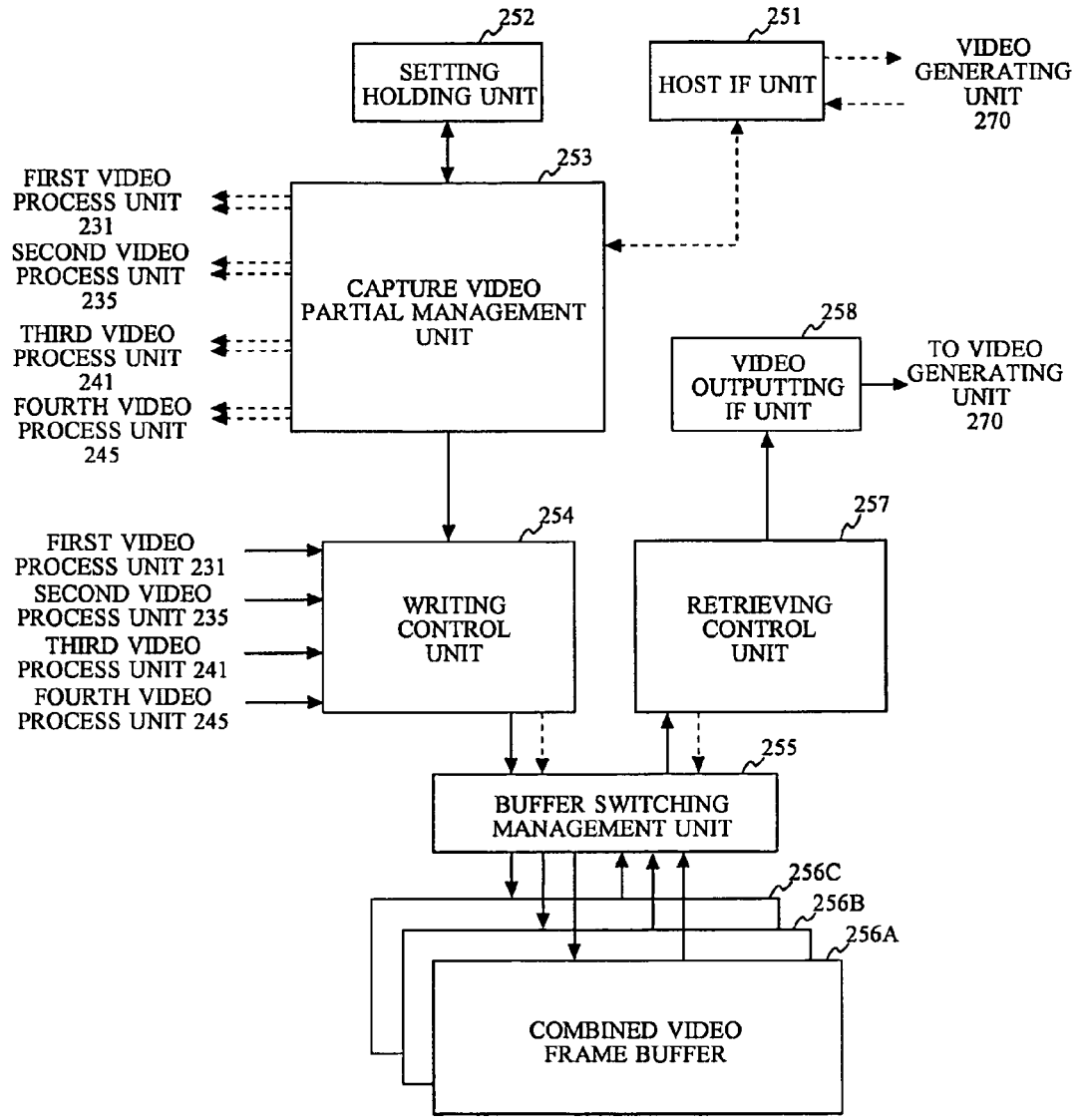
FIG. 8 is a diagram illustrating a composition of a video combining unit, a video outputting unit, and a control unit of a capture preprocessing unit.

A description will now be given of the capture preprocessing unit 250 with reference to FIG. 8.

The capture preprocessing unit 250 is provided with a host IF unit 251, a setting holding unit 252, the capture video partial management unit 253, the writing control unit 254, a buffer switching management unit 255, a combined video frame buffer 256 (in this embodiment, three combined video frame buffers 256A through 256C), a retrieving control unit 257, and a video outputting IF unit 258. A dashed arrow in FIG. 8 illustrates a control signal line, and a solid arrow illustrates a data line.

The host IF unit 251 acts as an interface with a video generating unit 260. The host IF unit 251 receives an instruction to change the generating pattern of the combined video data generated with combination of the partial video data, from the video generating unit 260. The host IF unit 251 outputs the received instruction to change the generating pattern, to the capture video partial management unit 253. The host IF unit 251 outputs a switching completion notice, which is output from the capture video partial management unit 253 in the case that the change of the generating pattern is completed, to the video generating unit 260 (a control unit 271).

Multiple setting information for generating combined video data by combining videos captured with cameras 110 to 140 are recorded in the setting holding unit 252 with respect to each generating pattern. Examples of the setting information will be illustrated in FIG. 9A. The setting information including video clipping position information, a reduction ratio, and a write start coordinate of the combined video frame buffer 256 is recorded with respect to each camera of cameras 110 to 140. This setting information is set with respect to each generating pattern of the generated video data.

The setting information may include a video clipping position and a write start coordinate with respect to each camera of cameras 110 to 140 as illustrated in FIG. 9B. The setting information illustrated in FIG. 9B is set with respect to each generating pattern of each generated video data.

The capture video partial management unit 253 acquires indication information of the generating pattern from the host IF unit 251. The capture video partial management unit 253 extracts the setting information according to the acquired indication information of the generating pattern from the setting holding unit 252. The capture video partial management unit 253 outputs the indication signal indicating the video clipping position to the first video clipping unit 232 through the fourth video clipping unit 246 on the basis of the extracted setting information. The capture video partial management unit 253 outputs the indication signal indicating the enlargement ratio or the reduction ratio of the partial video to the first zooming unit 233 through the fourth zooming unit 247 on the basis of the extracted setting information. The capture video partial management unit 253 indicates addresses of the combined video frame buffers 256A through 256C to which the partial video is written, to the writing control unit 254.

The writing control unit 254 writes the partial video input from the first video process unit 231 through the fourth video process unit 245 in the writing address indicated by the capture video partial management unit 253.

The buffer switching management unit 255 switches the combined video frame buffers 256A through 256C to which the partial video is written according to the control of the writing control unit 254. In addition, the buffer switching management unit 255 switches the combined video frame buffers 256A through 256C from which the combined video data is retrieved according to the control of the retrieving control unit 257.

The combined video frame buffers 256A through 256C are provided with three buffers. The first video inputting unit 211 through the fourth video inputting unit 214, and the first video process unit 231 through the fourth video process unit 245 process each video captured with cameras 110 to 140 respectively asynchronously. Therefore, two combined video frame buffers to which the writing control unit 254 writes the video are provided.

The retrieving control unit 257 retrieves the latest combined video data, which is already written to the combined video frame buffer, by requesting the buffer switching management unit 255 to retrieve, and outputs it to the video outputting IF unit 258.

The video outputting IF unit 258 is coupled to the video generating unit 270. The video outputting IF unit 258 outputs the partial video data retrieved by the retrieving control unit 257 to a video capture unit 275 of the video generating unit 270.

A description will now be given of a process of the process processing unit 220 executed according to the instruction from the capture video partial management unit 253 with reference to FIGS. 10A through 11C.

Front video data, rear video data, left video data, and right video data captured with cameras 110 to 140 respectively, are illustrated in FIG. 10A. FIG. 10B illustrates setting the clipping range of the partial video to each video data according to the indication signal from the capture video partial management unit 253. FIG. 10C illustrates clipping the partial video data according to the set clipping range. FIGS. 11A and 11B illustrate reducing the partial video according to the indication signal from the capture video partial management unit 253. FIG. 11B illustrates reducing the size of the rear video in the X-axis direction to half. FIG. 11C illustrates generating the combined video data by combining four partial video data. The combined video data illustrated in FIG. 11C is generated in the combined video frame buffer 256 as the writing control unit 254 writes each partial video data to the address of the combined video frame buffer 256 indicated by the capture video partial management unit 253.

Figure 12:
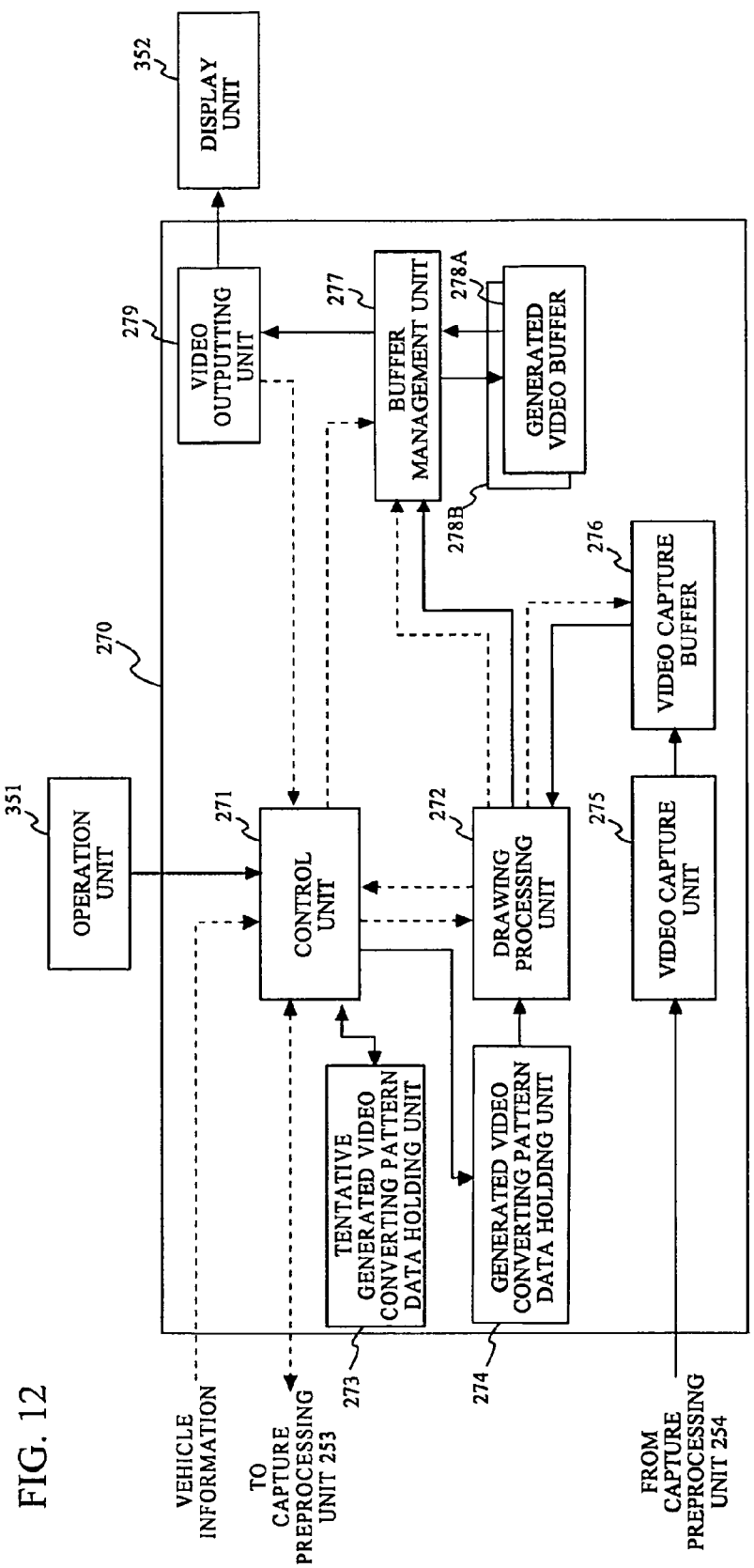
FIG. 12 is a diagram illustrating a composition of an video generating unit.

A description will now be given of the video generating unit 270 with reference to FIG. 12.

The video generating unit 270 is provided with the control unit 271, a drawing processing unit 272, a tentative generated video converting pattern data holding unit 273, a generated video converting pattern data holding unit 274, the video capture unit 275, a video capture buffer 276, a buffer management unit 277, a generated video buffer 278, and a video outputting unit 279. In FIG. 12, a dashed arrow illustrates a control signal line, and a solid arrow illustrates a data line.

Figures 13, 14A, 14B:
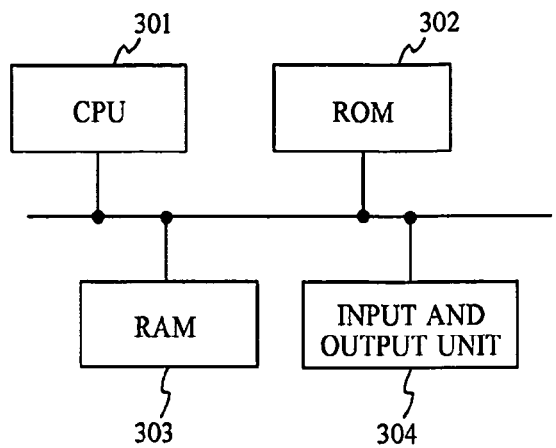
FIG. 13 is a diagram illustrating a composition of a control unit of an video generating unit.
FIGS. 14A and 14B are diagrams illustrating examples of tentative generated video converting pattern data and generated video converting pattern data.

The control unit 271 is provided with a CPU (Central Processing Unit) 301, a ROM (Read Only Memory) 302, a RAM (Random Access Memory) 303, and an input and output unit 304 as a hardware, as illustrated in FIG. 13.

Programs that the CPU 301 uses for the control are stored in the ROM 302. The CPU 301 reads programs stored in the ROM 302, and executes processes according to the read programs. Data that the CPU 301 uses for the calculation, and the calculation result are stored in the RAM 303.

The input and output unit 304 receives inputs from the operation unit 351, and receives the tentative generated video converting pattern data described later from the external and records it in the tentative generated video converting pattern data holding unit 273 by the control of the CPU 301 as an input and output port, for example.

The control unit 271 is coupled to the capture preprocessing unit 250, the drawing processing unit 272, the buffer management unit 277, and the video outputting unit 279 with the control signal line.

When the control unit 271 receives the instruction to change the generating pattern of the generated video through the operation unit 351, the control unit 271 instructs the drawing processing unit 272 and the capture preprocessing unit 250 to change the generating pattern of the generated video. The control unit 271 may acquire the vehicle information from the vehicle through the input and output unit 304, and instruct the drawing processing unit 272 and the capture preprocessing unit 250 to change the generating pattern of the generated video on the basis of the acquired vehicle information. For example, when the gear is got into reverse, the control unit 271 enlarges the area of the rear video in the combined video, and ensures the resolution of the rear video displayed wide, as it instructs the drawing processing unit 272 and the capture preprocessing unit 250 to switch the generated video to the generated video which displays the rear video wide.

In addition, the control unit 271 manages the generating timing of the generated video data with respect to each frame. When the generated video data for a frame is written to the generated video buffer 278 by the drawing processing unit 272, the control unit 271 receives a frame process completion notice from the drawing processing unit 272. When receiving the frame process completion notice from the drawing processing unit 272, the control unit 271 instructs the drawing processing unit 272 to start drawing the generated video data for the next frame (details of this process will be described later with reference to a flowchart).

In addition, the control unit 271 outputs the instruction signal to switch the generated video buffer 278 to which the generated video data is written to the buffer management unit 277. In this embodiment, the generated video buffer 278 is provided with two generated video buffers 278A and 278B. The control unit 271 selects the generated video buffer to which the drawing processing unit 272 writes the generated video data. In addition, the control unit 271 outputs the instruction signal to switch the generated video buffer 278 from which the generated video data is retrieved to the buffer management unit 277. In addition, when the video outputting unit 279 outputs the generated video for a frame, the control unit 271 receives a frame output completion notice that indicates that the video outputting unit 279 completes outputting the generated video for a frame.

The combined video data output from the video outputting IF unit 258 of the capture preprocessing unit 250 is input to the video capture unit 275. The video capture unit 275 receives the combined video data output from the video outputting IF unit 258, and outputs it to the video capture buffer 276.

The video capture buffer 276 captures the video by storing the combined video data output from the video capture unit 275. The combined video data stored in the video capture buffer 276 is output from the video capture buffer 276 to the drawing processing unit 272 according to the retrieve instruction of the drawing processing unit 272.

The tentative generated video converting pattern data (coordinate conversion data) illustrated in FIG. 14A is stored in the tentative generated video converting pattern data holding unit 273. The tentative generated video converting pattern is data for the coordinate conversion to convert each camera video to generated video data. This data is generated by an information processing apparatus such as a personal computer, and is recorded in the tentative generated video converting pattern data holding unit 273 by the control of the control unit 271. The tentative generated video converting pattern data is data to generate the generated video data from the video before each camera video is clipped, reduced, and combined by the capture preprocessing unit 250. The data of which the coordinate value is corrected by the control unit 271 is recorded in the generated video converting pattern data holding unit 274 as generated video converting pattern data. The tentative generated video converting pattern data includes, as illustrated in FIG. 14A, the polygon number, the vertex number of polygons that the polygon number indicates, the coordinate value information of each vertex before the conversion, and coordinate value information of the generated video data of each vertex after the conversion, for example. Polygons are partitions on the video, and processing units for a coordinate conversion when the combined video data is converted to the generated video data. The polygon number is the number to identify the polygon. The polygon number and the vertex number are not always necessary.

In addition, the tentative generated video converting pattern may be the pattern data illustrated in FIG. 14B. The tentative generated video converting pattern illustrated in FIG. 14B includes the polygon number, the vertex number of the polygon that the polygon number indicates, the coordinate value information on the video data of each vertex before the conversion, the coordinate value on the video projection plane defined in the three-dimensional video processing space, and viewpoint vector data of the three-dimensional video processing space. The viewpoint vector data is data to determine where the video projection plane is viewed from to generate the generated video data (see FIG. 17).

Referring to the generated video converting pattern stored in the generated video converting pattern data holding unit 274, the drawing processing unit 272 converts the combined video data retrieved from the video capture buffer 276 to the generated video data. A method such as a texture mapping method is used as a converting method, for example. The drawing processing unit 272 records the generated video data that the drawing processing unit 272 has generated in the generated video buffer 278.

The generated video data recorded in the generated video buffer 278 is retrieved by the video outputting unit 279, and displayed on the display unit 352.

Figure 15A:
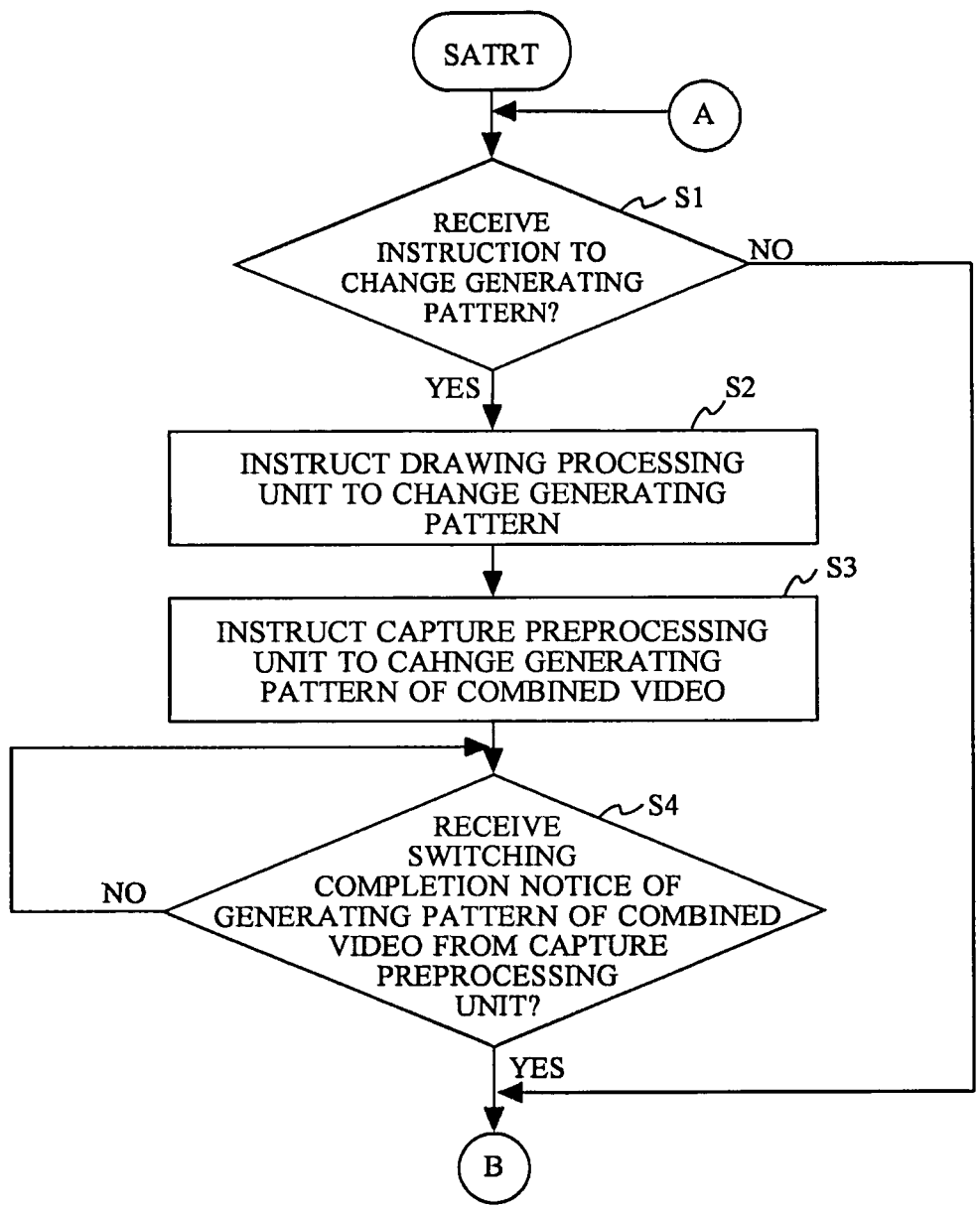
FIGS. 15A and 15B are flowcharts illustrating a process of a control unit.
Figure 15B:
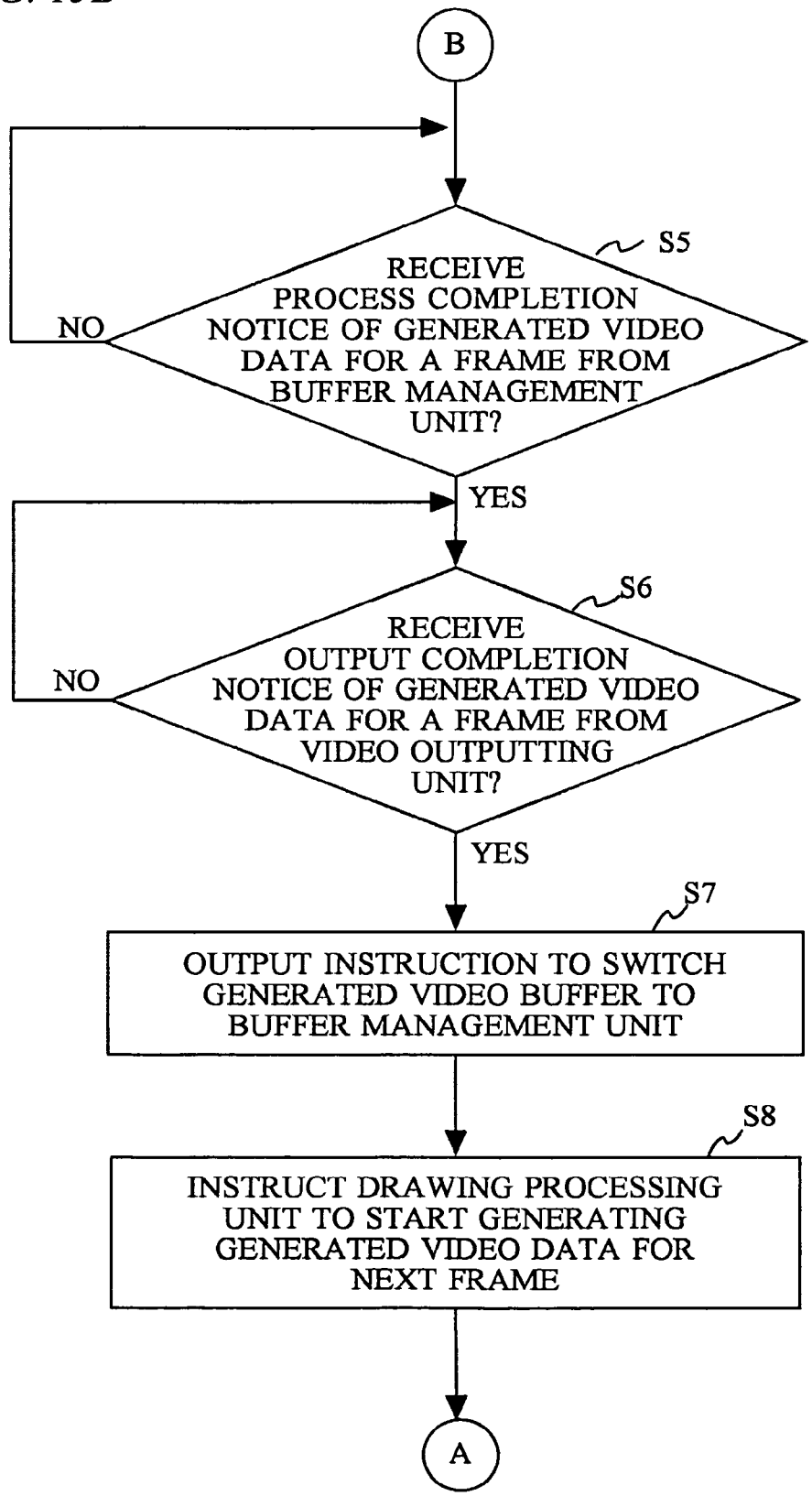

A description will now be given of the process of the control unit 271 to generate the generated video data from the combined video data, with reference to flowcharts illustrated in FIGS. 15A and 15B.

The control unit 271 determines whether the instruction to change the generating pattern of the generated video data is input from the operation unit 351. (step S1). When the instruction to change the generating pattern is input (step S1: YES), the control unit 271 instructs the drawing processing unit 272 to change the generating pattern (step S2). Then the control unit 271 outputs the instruction to change the generating pattern of the combined video to the capture preprocessing unit 250 (step S3). The control unit 271 determines whether it receives the change completion notice of the generating pattern of the combined video from the capture preprocessing unit 250 (step S4). The control unit 271 holds the next procedure till it receives the change completion notice from the capture preprocessing unit 250 (step S4: NO). A capture video partial management unit 253 of the capture preprocessing unit 250 extracts the setting information corresponding to the generating pattern indicated by the control unit 271 from the setting holding unit 252. Referring to the setting information, the capture video partial management unit 253 indicates the used range of each video data used for the indicated generating pattern to the first video clipping unit 232 through the fourth video clipping unit 246 respectively. Referring to the setting information, the capture video partial management unit 253 indicates the reduction ratio of the indicated generating pattern to the first zooming unit 233 through the fourth zooming unit 247.

When the control unit 271 receives the change completion notice from the capture preprocessing unit 250 (step S4: YES), the control unit 271 determines whether it receives the process completion notice of the generated video data for a frame from the buffer management unit 267 (step S5). The control unit 271 holds the next procedure till it receives the process completion notice from the buffer management unit 277 (step S5). When the control unit 271 receives the process completion notice from the buffer management unit 277 (step S5: YES), it determines whether it receives the output completion notice of the generated video data for a frame from the video outputting unit 279 (step S6). When the control unit 271 receives the output completion notice from the video outputting unit 279 (step S6: YES), it outputs the instruction to switch the generated video buffer 278, to the buffer management unit 277 (step S7). When the control unit 271 outputs the instruction to switch the generated video buffer 278, to the buffer management unit 277, the control unit 271 instructs the drawing processing unit 272 to start generating the generated video data for the next frame (step S8).

Figure 16A:
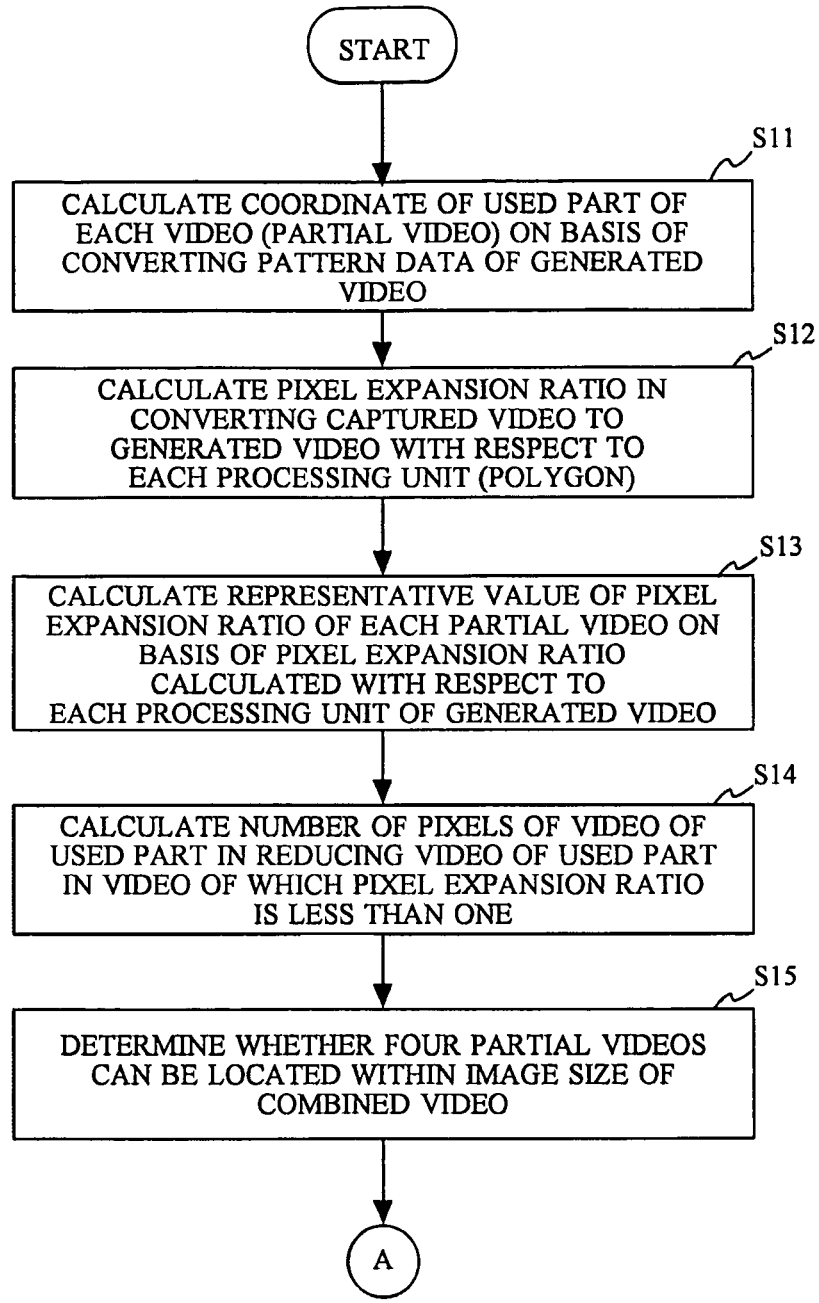
FIGS. 16A through 16C are flowcharts illustrating a process of a control unit to generate location information and generated video converting pattern data.
Figure 16B:
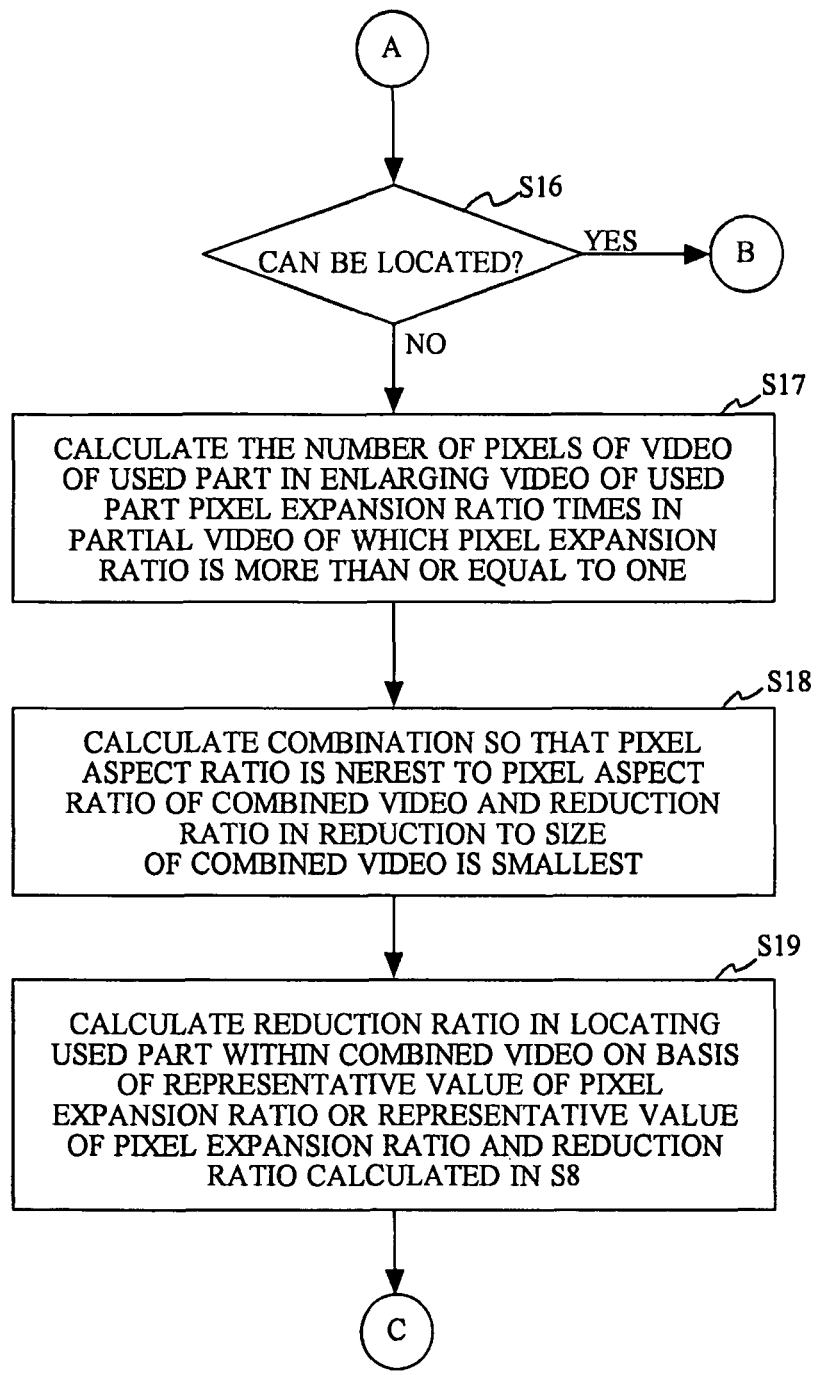
Figure 16C:
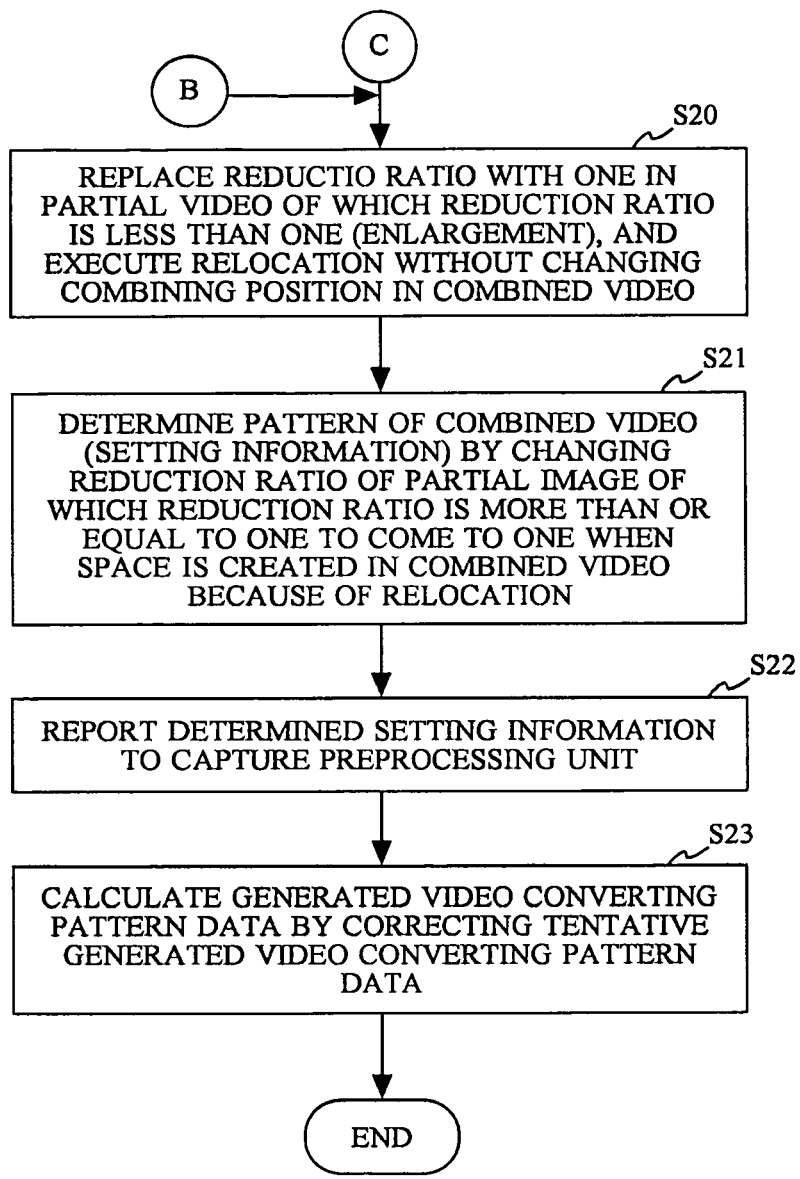

A description will now be given of a process of the control unit 271 to generate the generated video converting pattern data and the setting information stored in the setting holding unit 252 of the capture preprocessing unit 250 by using the tentative generated video converting pattern data, with reference to flowcharts illustrated in FIGS. 16A through 16C. The process described hereinafter, is not executed by inputting actual camera video data, but is executed by the calculation of the control unit 271, or with a personal computer on the case that the generated video is designed.

For the pre-preparation, the generated video is designed by an application software installed in an information processing apparatus such as a personal computer.

The user inputs data such as shape data of the video projection plane, the viewpoint vector, and a display range of the video to the application software. The application software generates the coordinate conversion data (tentative generated video converting pattern data) to convert the camera video to the generated video on the basis of the input data. The tentative generated video converting pattern data generated by the application software is loaded into the control unit 271 through the input and output unit 304, and recorded in the tentative generated video converting pattern data holding unit 273 by the control of the control unit 271.

Figure 17:
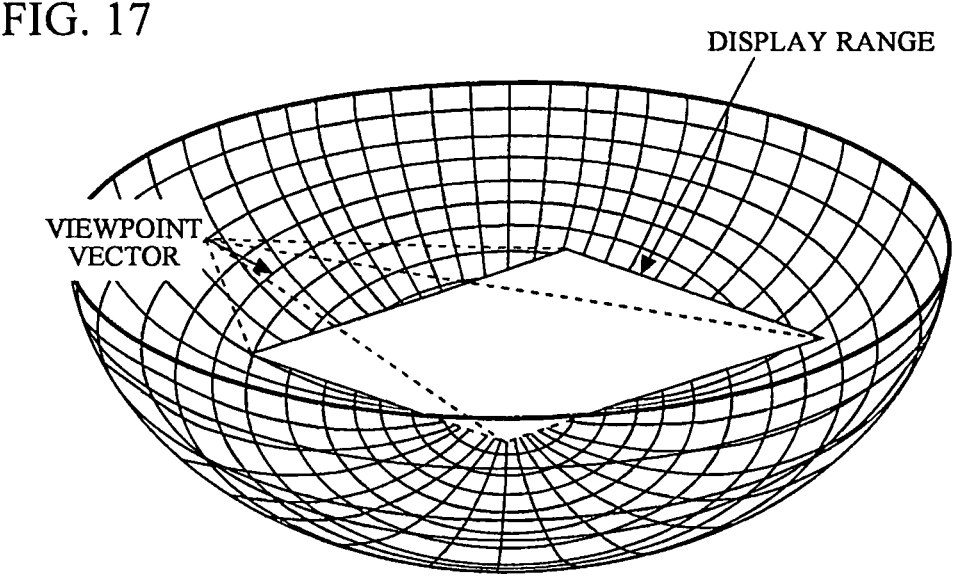
FIG. 17 is a diagram to explain a shape of video projection plane, a viewpoint vector, and a display range.
Figure 18A:
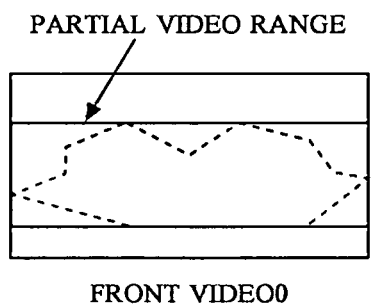
FIG. 18A is a diagram illustrating a partial video range representing a use part of a front video.
Figure 18B:
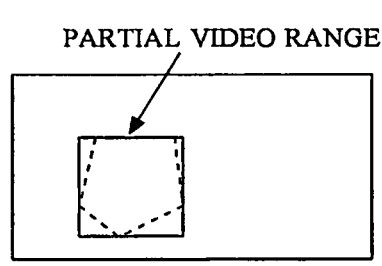
FIG. 18B is a diagram illustrating a partial video area representing a use part of a rear video.
Figure 18C:
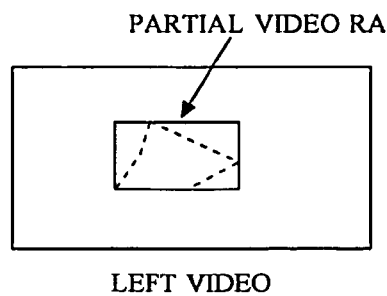
FIG. 18C is a diagram illustrating a partial video area representing a use part of a left video.
Figure 18D:
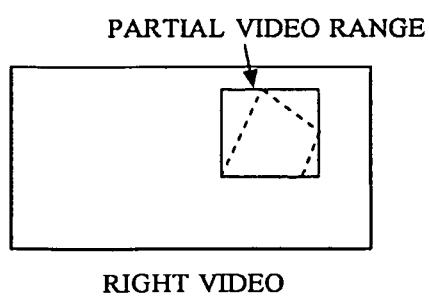
FIG. 18D is a diagram illustrating a partial video area representing a use part of a right video.

The shape data of the video projection plane is data to indicate the shape of the projection plane onto which the multiple videos captured with cameras 110 to 140 are projected, and data to convert the camera video to the generated video (see FIG. 17). The viewpoint vector data is data to indicate where the video projection plane is seen from to generate the generated video. The ratio in displaying each part of video captured with each camera of cameras 110 to 140 changes in accordance with these video projection plane and viewpoint vector data. The data of the display range of the video is data to indicate the range to display the video as illustrated in FIG. 17.

The control unit 271 calculates the coordinate value of the use part of each camera video, referring to the tentative generated video converting pattern data stored in the tentative generated video converting pattern data holding unit 273 (step S11).

As the tentative generated video converting pattern data is the conversion data to convert multiple camera videos to the generated video, the control unit 271 calculates the used range (the coordinate value) of the camera video from the tentative generated video converting pattern data. More specifically, on the basis of the tentative generated video converting pattern data, the control unit 271 detects the vertex coordinate of each camera video corresponding to the display range of the generated video data, and calculates the maximum and the minimum values of the vertex coordinate (Xmin, Ymin). The control unit 271 outputs the coordinate value of the rectangle of which the diagonal vertex is the calculated maximum and the calculated minimum values of the vertex coordinate (Xmin, Ymin) as the used range. FIGS. 18A through 18D illustrate determining each used range of the front video, the rear video, the left video, and the right video. As illustrated with a dashed line, when the used range is extracted free-form, the used range is calculated as a shape made by connecting the most outer sides of the used range.

The control unit 271 calculates the pixel expansion ratio when each camera video is converted to the generated video (step S12).

The control unit 271 executes the procedure of the step S12 to each camera video. The control unit 271 compares all video processing units (polygons) composing the generated video with the coordinate value of the polygon on the camera video, and calculates the pixel expansion ratio in the coordinate conversion (step S12). Polygons are processing units (pixels) in the coordinate conversion, and the control unit 271 calculates the pixel expansion ratio by calculating the coordinate values before and after the coordinate conversion of the polygon. The method to calculate the pixel expansion ratio may be a method to calculate the expansion ratio of the camera video in the X-axis direction and the Y-axis direction respectively, and a method to calculate the expansion ratio with the ratio between the area of the polygon of the camera video before the conversion and the area of the polygon of the generated video after the conversion, for example. Examples of the calculation results are illustrated in FIG. 19.

The control unit 271 determines the representative value of the pixel expansion ratio of each camera video (step S13). Using the pixel expansion ratio calculated with respect to each polygon in the step S12 above, the control unit 271 determines the representative value of the pixel expansion ratio of each camera video. The control unit 271 selects the maximum one from the pixel expansion ratios of each polygon, and determines it as the representative value of the pixel expansion ratio of the appropriate camera video. The control unit 271 may select the minimum one from the pixel expansion ratios of each polygon, and determine it as the representative value of the pixel expansion ratio; or the control unit 271 may calculate the average value or the intermediate value of the pixel expansion ratios of each polygon, and determine this average value or intermediate value as the representative value of the pixel expansion ratio.

Figures 19, 20, 21:
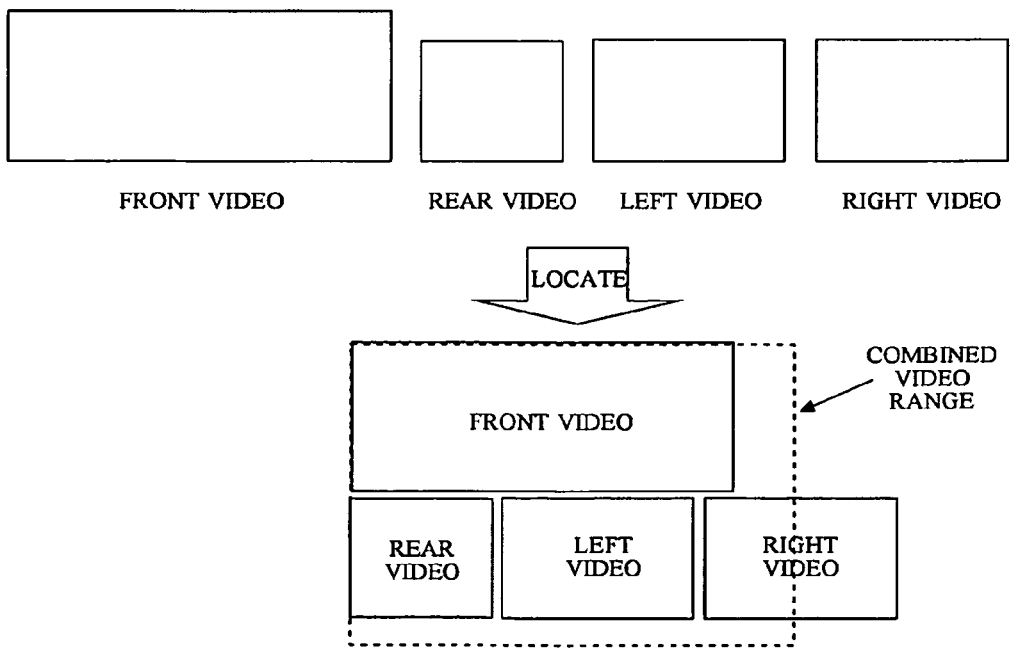
FIG. 19 is a diagram illustrating a pixel expansion ratio calculated with respect to each polygon.
FIG. 20 is a diagram illustrating a representative value of a pixel expansion ratio of each camera video.
FIG. 21 is a diagram illustrating a determination of whether a partial video data is within the size of combined video data.

Examples of the representative values of the pixel expansion ratio of each camera video are illustrated in FIG. 20. In examples illustrated in FIG. 20, the representative value of the pixel expansion ratio in the X-direction and the Y-direction is calculated with respect to each camera video.

Using the coordinate value of the use part of each camera video extracted in the step S11 (called a partial video, and not called the partial video data as it is not an actual video data), the control unit 271 reduces the partial video of the camera video of which the representative value of the pixel expansion ratio is less than one by the representative value of the pixel expansion ratio times, which means that the control unit 271 reduces the partial video so that the representative value of the pixel expansion ratio becomes one (step S14). More specifically, the control unit 271 multiplies the partial video by the representative value of the pixel expansion ratio, reduces the partial video by the representative value of the pixel expansion ratio times, and calculates the number of the pixels of the partial video multiplied by the representative value of the pixel expansion ratio in the X-axis direction and the Y-axis direction (ΔXtemp, ΔYtemp) respectively. The control unit 271 does not execute any process to the camera video of which the representative value of the pixel expansion ratio is more than or equal to one, and calculates the number of pixels in the X-axis direction and the Y-axis direction without process.

The control unit 271 determines whether all partial videos are within the regulation size of the combined video (step S15). The combined video is a video made with combination of multiple camera videos. To generate the generated video by executing the conversion process to this combined video in the video generating unit 270, the size of the combined video is determined as the regulation size (given size). The control unit 271 locates all partial videos within the combined video as illustrated in FIG. 21, and determines whether the partial videos can be located within the combined video.

When the partial videos can be located within the combined video (step S16: YES), the control unit 271 records the image size information of the partial video multiplied by the representative value of the pixel expansion ratio, and goes to a step S20.

When the partial videos can not be located within the combined video (step S16: NO), the control unit 271 enlarges the partial video of the camera video of which the representative value of the pixel expansion ratio is more than or equal to one the representative value of the pixel expansion ratio times (step S17). This means that the control unit 271 enlarges the partial video so that the representative value of the pixel expansion ratio of the use part of the video after the enlargement becomes one. The control unit 271 calculates the number of pixels of the partial video enlarged the representative value of the pixel expansion ratio times in the X-axis direction and the Y-axis direction respectively (step S17).

The control unit 271 calculates the combination of partial videos, of which the pixel aspect ratio is nearest to the aspect ratio of the combined video and the reduction ratio in the reduction to the image size of the combined video is smallest among all combinations of partial videos, and its reduction ratio.

Figure 22A:
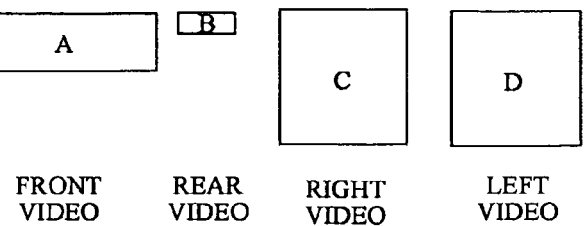
FIG. 22A illustrates partial video data of front, back, right, and left video data.
Figure 22B:
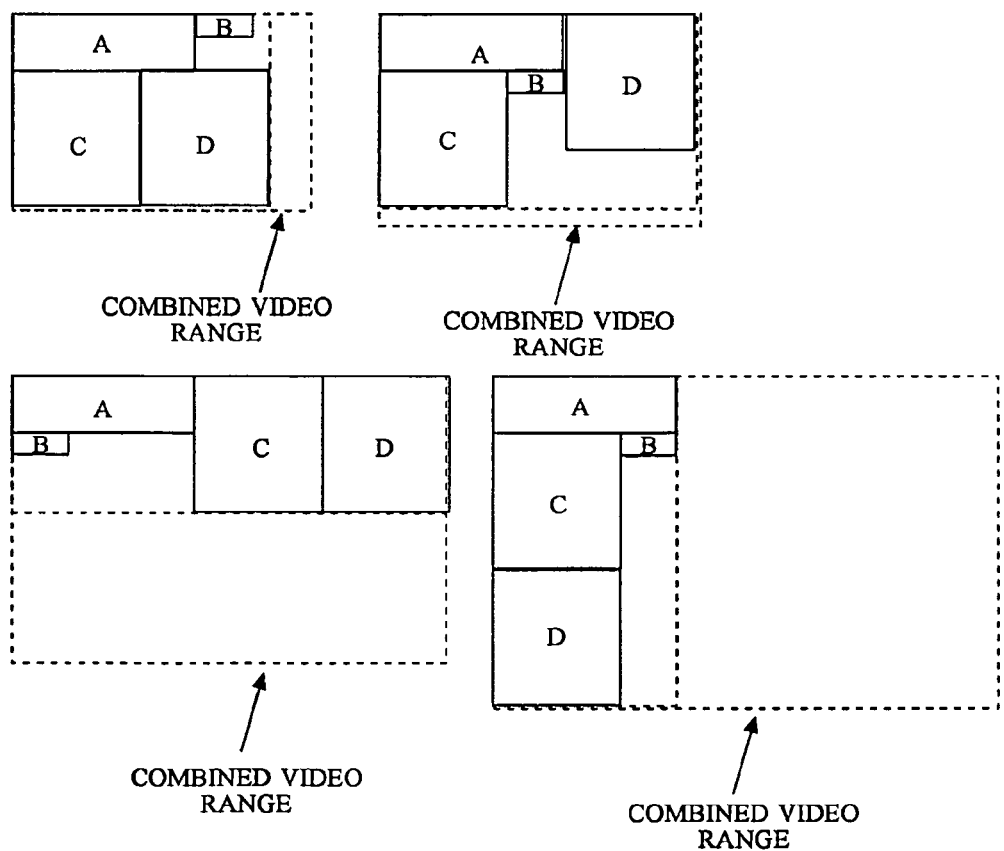
FIG. 22B is a diagram illustrating how to locate partial video data to come to an aspect ratio of the combined video data.

The control unit 271 sorts the partial videos reduced by the representative value of the pixel expansion ratio calculated in the step S14 times, and the partial videos enlarged the representative value of the pixel expansion ratio calculated in the step S17 times (hereinafter, these are called tentative-sized partial videos) within the image size of the combined video as illustrated in FIGS. 22A and 22B. The control unit 271 calculates the combination of partial videos, of which the pixel aspect ratio is nearest to the aspect ratio of the combined video and the reduction ratio in the reduction to the image size of the combined video is smallest, and its reduction ratio. FIG. 22A illustrates tentative-sized partial videos of the front, rear, left, and right directions. FIG. 22B illustrates sorting these tentative-sized partial videos.

The control unit 271 calculates the actual reduction ratio of each partial video on the basis of the reduction ratio calculated in the step S18 and the representative value of the pixel expansion ratio (step S19). More specifically, the control unit 271 calculates the product of the reduction ratio and the representative value of the pixel expansion ratio with respect to each partial video.

Figure 23A:
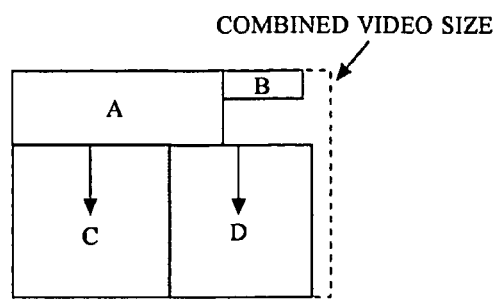
FIGS. 23A through 23D are diagrams illustrating a process of changing a reduction ratio of partial video data to be enlarged to one and relocating partial video data within combined video data.
Figure 23B:
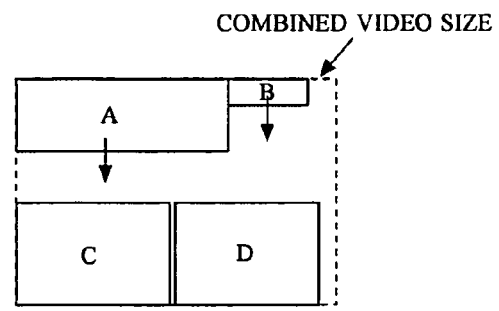
Figure 23C:
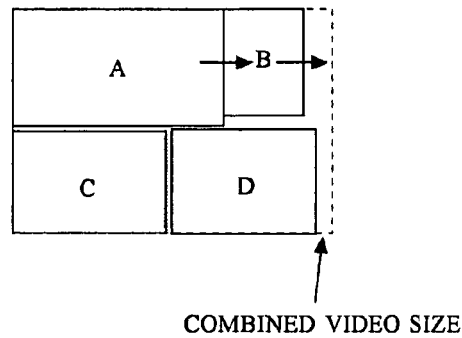
Figure 23D:
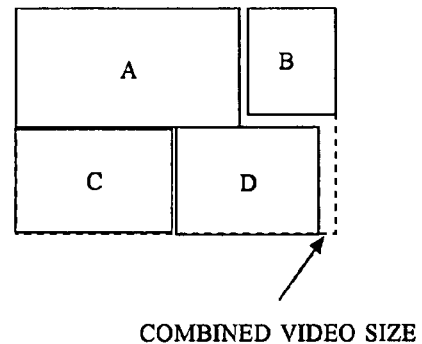

The control unit 271 determines whether the partial video of which the reduction ratio calculated in the step S19 is less than one (it means the enlargement) exists (step S20). When the partial video of which the reduction ratio is less than one exists, the control unit 271 replaces the reduction ratio of the partial video of which the reduction ratio is less than one with one, and relocates partial videos without changing the combining position on the combined video. When the space is created within the image size of the combined video by relocation, the control unit 271 equally changes the reduction ratio so that the reduction ratio of the partial videos of which the reduction ratio is more than or equal to one (it means the reduction) becomes near to one (step S21). In examples illustrated in FIGS. 23A through 23D, as the reduction ratios of partial videos A and B are more than or equal to one, the control unit 271 executes the size conversion to make reduction ratios of these partial videos one, and relocates these partial videos. The result of the size conversion and relocation is illustrated in FIGS. 23C and 23D.

The control unit 271 determines the combined video pattern data after procedures above. The control unit 271 outputs the determined combined video pattern data to the capture preprocessing unit 250 as the setting information, and records it in the setting holding unit 252 (step S22).

The control unit 271 corrects the tentative generated video converting pattern data by using the location information of the camera video in the combined video (setting information) (step S23). The control unit 271 stores the corrected tentative generated video converting pattern data in the generated video converting pattern data holding unit 264 as the generated video converting pattern data. When correcting the tentative generated video converting pattern data to the generated video converting pattern data, the control unit 271 may also make a correction to deal with the installation condition of the camera by using the installation condition information of the camera to the vehicle and the camera characteristics data. The installation condition information of the camera includes the position coordinate of the camera (X, Y, Z), and mounting angles (a yaw angle, a depression angle, and a roll angle). The camera characteristics data includes the number of pixels of the camera video (horizontal and vertical), field angles (horizontal and vertical), and lens distortion data.

In the steps S14 and S17, the image size of the partial video of which the representative value of the pixel expansion ratio is less than one, and the size of the partial video of which the representative value of the pixel expansion ratio is more than or equal to one, are changed so that the representative value of the pixel expansion ratio becomes one. Thus, in the actual data processing, the representative value of the pixel expansion ratio of the partial video data enlarged according to the coordinate conversion from the combined video data to the generated video data becomes equivalent between each partial video.

When priority is set on camera videos, the reduction ratio of the high-priority camera video may be determined first, and then the reduction ratio of other camera videos may be determined. For example, when the front video is designated as a priority video, the partial video data is clipped from the front camera video, and the size of this partial video data is not changed and fixed. Then, the size of the partial video data clipped from other camera videos is reduced so as to be within the size of the combined video data. After the partial video data is clipped from each camera video and the reduction ratios of all partial video data are calculated, the reduction ratio of the high-priority video data is reduced by fifty percent, the reduction ratio of rest of partial video data may be changed so as to be within the size of the combined video data.

According to this embodiment, if the coordinate conversion data for generating the generated video is provided, it is possible to generate generated video data by calculating the clipped range of the camera video and the reduction ratio with the video processing apparatus 1 and generating the combined video data from the actual input camera video. If multiple coordinate conversion data are provided, it is possible to generate generated video data of which the video pattern is changed in response to the running condition of the vehicle.

As the size of each partial video is adjusted so that the representative value of the pixel expansion ratio of the partial video are equivalent between each partial video, it is possible to enlarge the partial video almost evenly in executing the coordinate conversion to generate the generated video.

As the size of the partial video is adjusted so that the high-priority video data is not reduced, the high-priority video data is not reduced in generating the generated video.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various change, substitutions, and alterations could be made hereto without departing from the spirit and scope of the invention.

For example, in the above embodiment, although the pixel expansion ratios of all polygons are calculated, it is not necessary to calculate the pixel expansion ratios of polygons in the area away from the vehicle. As videos near the vehicle are important for drive assist, it is not necessary to visualize other videos at high resolution, and it is possible to make them out of the processing object.

Figure 24:
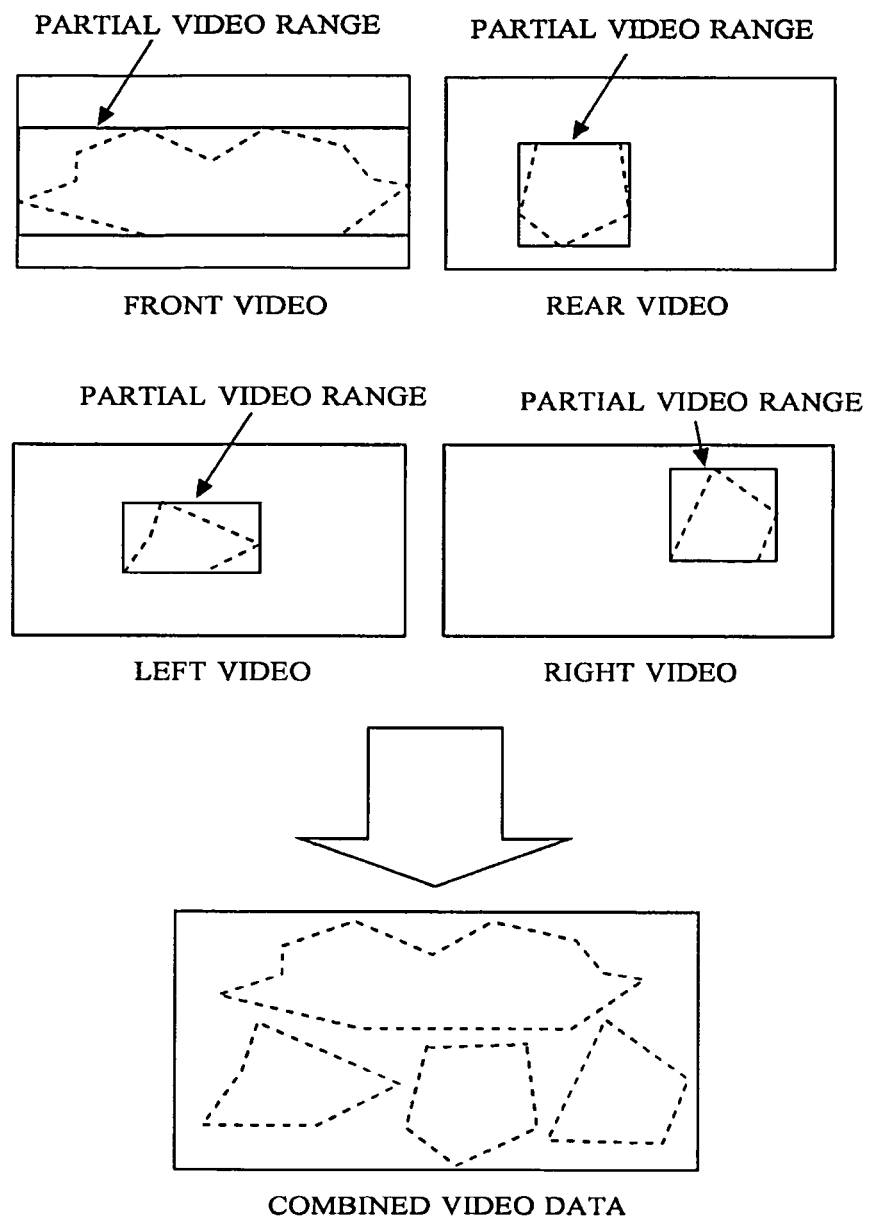
FIG. 24 is a diagram illustrating combined video data in the case that partial video data is clipped free-form.

When the partial video is clipped from the camera video as illustrated in FIG. 24, the partial video may be clipped free-form. FIG. 24 illustrates an example of the combined video data made with combination of the partial videos clipped free-form.

What is claimed is:

1. A video processing apparatus capable of cooperating with a plurality of capturing unit and a display unit, the video processing apparatus comprising:
    a plurality of video inputting units that input each of a plurality of video data captured with the plurality of capturing units;
    a pattern information storing unit that stores a plurality of setting information, each of which includes first information that indicates a clipping range of each of a plurality of partial video data to be clipped from the plurality of video data, and second information that includes locations of the plurality of partial video data in combined video data with respect to each of generating patterns of generated video data;
    a generated video pattern selecting unit that selects a pattern of generated video data from the generating patterns;
    a process unit that first clips the plurality of partial video data from the plurality of video data based on the first information included in the setting information corresponding to the selected pattern, and then combines the plurality of partial video data that have been clipped based on the locations included in the second information of the setting information corresponding to the selected pattern to generate the combined video data corresponding to the selected pattern;
    a video outputting unit that coordinate-converts, with first coordinate conversion data preliminarily calculated with respect to each pattern of the generating patterns, the combined video data generated by the process unit to generate the generated video data that is stereoscopic display, and outputs the generated video data to the display unit, wherein
        the second information includes a reduction ratio of each of the plurality of partial video data, and
        the process unit generates the combined video data by reducing each of the plurality of partial video data based on the reduction ratio included in the second information of the setting information corresponding to the selected pattern and combining the plurality of partial video data that have been reduced based on the locations of the second information included in the setting information corresponding to the selected pattern;
    a coordinate value calculating unit that calculates the clipping range of each of the plurality of partial video data by referring to second coordinate conversion data that is data for a coordinate conversion of each of the plurality of video data into generated video data and is preliminarily calculated with respect to the generating pattern of the generated video data; and
    a location calculating unit that calculates the reduction ratio and the location so that a pixel expansion in generating the generated video data by coordinate-converting the combined video data is small and a size of the combined video data made by locating the plurality of partial video data is within a given size,
    wherein the reduction ratio and the location are calculated so that one of an average value, an intermediate value, and a maximum value or a minimum value of pixel expansion ratios of processing units or pixel units in the coordinate conversion of the combined video data into the generated video data is equivalent among the plurality of partial video data, and a size of the combined video data made by locating the plurality of partial video data is within a given size.

2. The video processing apparatus according to claim 1, wherein the reduction ratio and the location are calculated so that one of an average value, an intermediate value, and a maximum value or a minimum value of pixel expansion ratios of processing units or pixel units in the coordinate conversion of the combined video data into the generated video data is equivalent among the plurality of partial video data, and a size of the combined video data made by locating the plurality of partial video data is within a given size.

3. The video processing apparatus according claim 1, wherein the reduction ratio and the location are calculated after fixing a reduction ratio of partial video data of which priority is preliminarily set to high.

4. The video processing apparatus according to claim 2, wherein the reduction ratio and the location are calculated after fixing a reduction ratio of partial video data of which priority is preliminarily set to high.

5. The video processing apparatus according to claim 1, further comprising:
- a generated video pattern selection inputting unit that determines a pattern of generated video data to be generated;
- a combined video pattern selection notification unit that notifies the video processing apparatus of a pattern of the combined video data corresponding to a determined pattern of the generated video data; and
- a video processing unit that generates the generated video data by using the combined video data input from the video processing apparatus.

6. The video processing apparatus according to claim 2, further comprising: a generated video pattern selection inputting unit that determines a pattern of generated video data to be generated; a combined video pattern selection notification unit that notifies the video processing apparatus of a pattern of the combined video data corresponding to a determined pattern of the generated video data; and a video processing unit that generates the generated video data by using the combined video data input from the video processing apparatus.

7. The video processing apparatus according to claim 3, further comprising: a generated video pattern selection inputting unit that determines a pattern of generated video data to be generated; a combined video pattern selection notification unit that notifies the video processing apparatus of a pattern of the combined video data corresponding to a determined pattern of the generated video data; and a video processing unit that generates the generated video data by using the combined video data input from the video processing apparatus.

8. The video processing apparatus according to claim 4, further comprising: a generated video pattern selection inputting unit that determines a pattern of generated video data to be generated; a combined video pattern selection notification unit that notifies the video processing apparatus of a pattern of the combined video data corresponding to a determined pattern of the generated video data; and a video processing unit that generates the generated video data by using the combined video data input from the video processing apparatus.

* * * * *

UNITED STATES PATENT AND TRADEMARK OFFICE
CERTIFICATE OF CORRECTION

| | | |
|---|---|---|
| PATENT NO. | : 8,736,665 B2 | Page 1 of 1 |
| APPLICATION NO. | : 12/654432 | |
| DATED | : May 27, 2014 | |
| INVENTOR(S) | : Kawai et al. | |

It is certified that error appears in the above-identified patent and that said Letters Patent is hereby corrected as shown below:

In the Claims

Column 14, Line 66, in Claim 3, delete "according" and insert -- according to --, therefor.

Signed and Sealed this
Nineteenth Day of August, 2014

Michelle K. Lee
*Deputy Director of the United States Patent and Trademark Office*